United States Patent
Ziaylek

(10) Patent No.: US 7,975,978 B2
(45) Date of Patent: Jul. 12, 2011

(54) POSITIVELY ENGAGING MOUNTING APPARATUS FOR SECURELY AND DETACHABLY RETAINING OF A CYLINDRICAL TANK

(76) Inventor: Michael P. Ziaylek, Yardley, NJ (US)

( * ) Notice: Subject to any disclaimer, the term of this patent is extended or adjusted under 35 U.S.C. 154(b) by 476 days.

(21) Appl. No.: 12/291,251

(22) Filed: Nov. 7, 2008

(65) Prior Publication Data

US 2009/0127416 A1 May 21, 2009

Related U.S. Application Data

(60) Provisional application No. 61/004,070, filed on Nov. 21, 2007.

(51) Int. Cl.
A47K 1/08 (2006.01)
(52) U.S. Cl. ............ 248/311.3; 248/154; 248/313; 297/188.04
(58) Field of Classification Search .......... 248/231.85, 248/313, 311.3, 154, 121, 146, 145.3, 314; 297/188.04, 188.5
See application file for complete search history.

(56) References Cited

U.S. PATENT DOCUMENTS

| | | | |
|---|---|---|---|
| 2,431,698 A | 12/1947 | Lombard | |
| 2,615,238 A | 10/1952 | Highwood | |
| 3,194,529 A | 7/1965 | Brock | |
| 3,547,391 A | 12/1970 | Johnson | |
| 3,565,384 A | 2/1971 | Lockwood | |
| 3,603,550 A | 9/1971 | Byrd | |
| D222,527 S | 11/1971 | Ziaylek, Jr. | |
| 3,667,714 A | 6/1972 | Ziaylek, Jr. | |
| 3,780,972 A | 12/1973 | Brodersen | |
| 3,823,907 A | 7/1974 | Ziaylek, Jr. | |
| D237,357 S | 10/1975 | Ziaylek, Jr. | |
| 3,971,591 A | 7/1976 | Ziaylek | |
| D245,929 S | 9/1977 | Montambo | |
| 4,213,592 A | 7/1980 | Lingenfelser | |
| D264,935 S | 6/1982 | Ziaylek, Jr. | |
| D265,287 S | 7/1982 | Ziaylek, Jr. | |
| D267,227 S | 12/1982 | Ziaylek, Jr. | |
| 4,379,541 A | 4/1983 | Harkness | |
| 4,505,448 A | 3/1985 | Massie | |
| 4,586,687 A | 5/1986 | Ziaylek, Jr. | |
| D298,704 S | 11/1988 | Ziaylek, Jr. | |
| 4,848,714 A | 7/1989 | Ziaylek, Jr. et al. | |
| D303,738 S | 10/1989 | Ziaylek, Jr. | |
| D314,325 S | 2/1991 | Ziaylek, Jr. et al. | |
| D319,778 S | 9/1991 | Ziaylek, Jr. | |
| 5,213,392 A | 5/1993 | Bostrom et al. | |
| 5,314,233 A | 5/1994 | Bostrom et al. | |
| D347,735 S | 6/1994 | Ziaylek, Jr. et al. | |
| 5,681,080 A * | 10/1997 | Pond et al. | 297/188.05 |
| D390,367 S | 2/1998 | Demski et al. | |
| D394,381 S | 5/1998 | Ziaylek, Jr. et al. | |
| 5,803,544 A | 9/1998 | Block et al. | |
| 5,934,749 A | 8/1999 | Pond et al. | |

(Continued)

Primary Examiner — Ramon O Ramirez
(74) Attorney, Agent, or Firm — Sperry, Zoda & Kane

(57) ABSTRACT

A releasable mounting apparatus for securely retaining of a cylindrical tank in an inverted vertical position adjacent to a seat back assembly of an emergency vehicle including a foot plate and a top clamping assembly between which a tank receiving zone is defined for receiving and holding of a cylindrical tank in the inverted position. The top clamping assembly can include a three part positioning apparatus including a rear positioning device and an upper centering guide as well as a top clamping member. Preferably the top clamping member is movable between a lower clamping position and an upper retaining position for facilitating securing and releasing of a cylindrical tank relative to the receiving zone thereof.

30 Claims, 14 Drawing Sheets

U.S. PATENT DOCUMENTS

| | | |
|---|---|---|
| 5,975,475 A | 11/1999 | Chaplin |
| D419,317 S | 1/2000 | Pond et al. |
| D424,414 S | 5/2000 | Ziaylek et al. |
| 6,086,312 A | 7/2000 | Ziaylek et al. |
| D434,495 S | 11/2000 | Whalen et al. |
| 6,220,557 B1 | 4/2001 | Ziaylek et al. |
| 6,543,736 B2 | 4/2003 | Field |
| 6,601,923 B2 | 8/2003 | Pond et al. |
| D480,294 S | 10/2003 | Ziaylek, Jr. et al. |
| 6,655,745 B2 | 12/2003 | Fohrenkamm et al. |
| 6,702,242 B1 | 3/2004 | Ziaylek, Jr. et al. |
| D494,049 S | 8/2004 | Ziaylek et al. |
| D494,453 S | 8/2004 | Ziaylek et al. |
| 6,769,659 B1 | 8/2004 | Martello |
| 6,830,226 B2 | 12/2004 | Field et al. |
| 6,883,766 B1 | 4/2005 | Ziaylek et al. |
| 6,926,243 B1 | 8/2005 | Ziaylek et al. |
| 2003/0038525 A1 | 2/2003 | Pond et al. |
| 2009/0045657 A1* | 2/2009 | Bostrom et al. ......... 297/188.04 |
| 2010/0219220 A1* | 9/2010 | Bostrom et al. ............... 224/547 |
| 2011/0079696 A1* | 4/2011 | Hofferber ..................... 248/313 |

* cited by examiner ered Jul. 13, 1865 to G. R. Brock and assigned to Sterling
POSITIVELY ENGAGING MOUNTING APPARATUS FOR SECURELY AND DETACHABLY RETAINING OF A CYLINDRICAL TANK The present application hereby formally claims priority of currently pending U.S. Provisional Patent Application No. 61/004,070 filed Nov. 21, 2007 on a "Tank Holding Bracket Means With Rotating Locking Block" filed by inventor Michael P. Ziaylek, the inventor listed herein and said referenced provisional application is hereby formally incorporated by reference as an integral part of the present application.

Also, the present application hereby formally claims priority of currently pending U.S. Provisional Patent Application No. 61/072,690 filed Apr. 2, 2008 on a "Tank Holding Bracket Means With Rotating Locking Head And supplemental Bracket With Adjustable Height Foot Means" filed by inventor Michael P. Ziaylek, the inventor listed herein and said referenced provisional application is hereby formally incorporated by reference as an integral part of the present application.

BACKGROUND OF THE INVENTION

1. Field of the Invention

The present invention deals with the field of brackets and other mounting devices utilized for detachably securing of cylindrical tanks such as emergency breathing tanks in position with respect to the seat back of an emergency vehicle such that the tank is fully and securely held therein but is also available for quick and easy removal by emergency personnel once the vehicle within which the seat back assembly is positioned reaches the location of the specific emergency being addressed. Such devices provide various means for securing of the tank and usually include clamping mechanisms and securement arms and a releasing means. Some of these devices are utilized for storing of the cylindrical tank in inverted positions and some are usable for supporting them in the upright position. These assemblies are normally positioned within the seat backs of emergency vehicles such as ambulances and, most particularly, fire trucks, wherein multiple firefighting personnel are seated in vehicle seats and are transported within the emergency vehicle to the location of the fire or other emergency.

2. Description of the Prior Art

Many of prior art devices have been utilized to define seat backs for emergency vehicles which are designed to hold self-contained breathing apparatus such as shown in U.S. Pat. No. 2,431,698 patented Dec. 2, 1947 to H. Lombard on a "Removable Mounting Installation"; and U.S. Pat. No. 2,615,238 patented Oct. 28, 1952 to W. Highwood on a "Tank Clamp Support Holder"; and U.S. Pat. No. 3,194,529 patented Jul. 13, 1865 to G. R. Brock and assigned to Sterling Precision Corporation; and U.S. Pat. No. 3,547,391 patented Dec. 15, 1970 to D. E. Johnson on a "Quick Release Support For Rescue Breathing Apparatus"; and U.S. Pat. No. 3,565,384 patented Feb. 23, 1971 to L. A. Lockwood and assigned to Bernzomatic Corporation on a "Bracket For Holding And Clamping Gas Cylinder Type Fire Extinguisher Tanks"; and U.S. Pat. No. 3,603,550 patented Sep. 7, 1971 to C. D. Byrd and assigned to Lacy J. Miller Machine Company, Inc. on a "Quick Release Support"; and U.S. Pat. No. 3,667,714 patented Jun. 6, 1972 to T. Ziaylek, Jr. on a "Tank Support"; and U.S. Pat. No. 3,780,972 patented Dec. 25, 1973 to J. C. Brodersen on a "Mounting Apparatus For Gas Containers"; and U.S. Pat. No. 3,823,907 patented Jul. 16, 1974 to T. Ziaylek, Jr. on a "Positive Locking Device"; and U.S. Pat. No. 3,971,591 patented Jul. 27, 1976 to J. Ziaylek and assigned to Ziamatic Corporation on a "Quick-Seat"; and U.S. Pat. No. 4,213,592 patented Jul. 22, 1980 to D. J. Lingenfelser and assigned to Caterpillar Tractor Co. on a "Bracket Assembly For Mounting Fire Extinguishers Thereon"; and U.S. Pat. No. 4,379,541 patented Apr. 12, 1983 to D. M. Harkness on a "Holder For A Container"; and U.S. Pat. No. 4,505,448 patented Mar. 19, 1985 to C. P. Massie on a "Bracket For Fire Extinguishers"; and U.S. Pat. No. 4,586,687 patented May 6, 1986 to T. Ziaylek, Jr. on an "Air Tank Support Of The Quick Release Type"; and U.S. Pat. No. 4,848,714 patented Jul. 18, 1989 to T. Ziaylek, Jr. et al on a "Mounting Plate With Rollers"; and U.S. Pat. No. 5,213,392 patented May 25, 1993 to J. M. Bostrom et al on a "Seat Construction"; and U.S. Pat. No. 5,314,233 patented May 24, 1994 to J. M. Bostrom et al on a "Seat Construction Having A Mechanism For Storing A Tank"; and U.S. Pat. No. 5,681,080 patented Oct. 28, 1997 to G. M. Pond et al and assigned to Seats, Inc. on a "Vehicle Seat For Person Wearing Self-Contained Breathing Apparatus"; and U.S. Pat. No. 5,803,544 patented to W. R. Block et al on Sep. 8, 1998 and assigned to H. O. Bostrom Company, Inc. on a "Seat Construction With Removable Side Cushions"; and U.S. Pat. No. 5,934,749 patented Aug. 10, 1999 to G. M. Pond et al and assigned to Seats, Inc. on a "Vehicle Seat With Removable Bolsters And pivoting Headrest Members"; and U.S. Pat. No. 5,975,475 patented Nov. 2, 1999 to G. S. Chaplin on a "Fire Extinguisher Holder"; and U.S. Pat. No. 6,086,312 patented Jul. 11, 2000 to M. P. Ziaylek et al on a "Tank Handling Apparatus"; and U.S. Pat. No. 6,220,557 patented Apr. 24, 2001 to M. P. Ziaylek et al and assigned to Michael P. Ziaylek, Theodore Ziaylek, Jr. and Theodore P. Ziaylek on a "Mounting Bracket Means For Detachably Supporting A Generally Cylindrically-Shaped Member Upon A Wall Structure"; and U.S. Pat. No. 6,543,736 patented Apr. 8, 2003 to B. J. Field and assigned to Pacific Safety Products Inc. on a "Quick Release Supporting Apparatus For A Canister"; and U.S. Pat. No. 6,601,923 patented Aug. 5, 2003 to G. Pond et al and assigned to Seats Incorporated on an "Emergency Vehicle Seat With Integrated Seat Belt"; and U.S. Pat. No. 6,655,745 patented Dec. 2, 2003 to J. A. Fohrenkamm et al and assigned to H.O. Bostrom Company, Inc. on an "Emergency Vehicle Seat With Integrated Seat Belt"; and U.S. Pat. No. 6,702,242 patented Mar. 9, 2004 to T. Ziaylek, Jr. et al on a "Releasable Tank Holding Assembly Securable To A Hollow Seat Back To Facilitate Detachable Securement Of A Tank Thereinto"; and U.S. Pat. No. 6,769,659 patented Aug. 3, 2004 to G. A. Martello on a "Bottle Bracket"; and U.S. Pat. No. 6,830,226 patented Dec. 14, 2004 to B. J. Field and assigned to Pacific Safety Products Inc. on a "Quick Release Supporting Apparatus For A Canister"; and U.S. Pat. No. 6,883,766 patented Apr. 26, 2005 to M. P. Ziaylek et al on a "Quick Release Mechanical Bracket"; and U.S. Pat. No. 6,926,243 patented Aug. 9, 2005 to M. P. Ziaylek et al on a "Mounting Bracket With An Ejection Means For Detachable Retaining Of A Cylindrical Tank Member"; and United States Publication No. US 2003/0038525 A1 published Feb. 27, 2003 to G. Pond et al and assigned to Seats, Inc. on an "Emergency Vehicle Seat With Integrated Seat Belt"; and U.S. Design Pat. No. D222,527 patented Nov. 2, 1971 to T. Ziaylek, Jr. on a "Bracket For Use With Lifesaving Equipment"; and U.S. Design Pat. No. D237,357 patented to T. Ziaylek, Jr. and assigned to Ziamatic Corporation on Oct. 28, 1975 on a "Tank Support Bracket For Lifesaving Equipment"; and U.S. Design Pat. No. D245,929 patented Sep. 27, 1977 to R. JU. Montambo and assigned to The Ansul Company on a "Fire Extinguisher Bracket"; and U.S. Design Pat.

No. D264,935 patented Jun. 15, 1982 to T. Ziaylek, Jr. and assigned to Ziamatic Corporation on a "Combined Support And Display Bracket For A Self-Contained Breathing Apparatus"; and U.S. Design Pat. No. D265,287 patented Jul. 6, 1982 to T. Ziaylek, Jr. on a "Support Bracket For Biomarine Breathing Apparatus"; and U.S. Design Pat. No. D267,227 patented Dec. 14, 1982 to T. Ziaylek, Jr. and assigned to Ziamatic Corporation on a "Support Bracket For A Gas Cylinder"; and U.S. Design Pat. No. D298,704 patented Nov. 29, 1988 to T. Ziaylek, Jr. on a "Seat For Use Primarily In Emergency Vehicles"; and U.S. Design Pat. No. D303,738 patented Oct. 3, 1989 to T. Ziaylek, Jr. on a "Rotatable Cylinder Holder"; and U.S. Design Pat. No. D314,325 patented Feb. 5, 1991 to T. Ziaylek, Jr. et al on a "Clamping Set Of Bracket Arms For Supporting Tubular Objects"; and U.S. Design Pat. No. D319,778 patented Sep. 10, 1991 to T. Ziaylek, Jr. on a "Vertical Support Brace Bracket Panel For Holding Tubular Objects"; and U.S. Design Pat. No. D347,735 patented Jun. 14, 1994 to T. Ziaylek, Jr. et al on a "Quick Release Support Tank Bracket"; and U.S. Design Pat. No. D390,367 patented Feb. 10, 1998 to R. F. Demski et al and assigned to Seats, Inc. and Pierce Manufacturing Inc. on a "Vehicle Seat"; and U.S. Design Pat. No. D394,381 patented May 19, 1998 to T. Ziaylek, Jr. et al on a "Tank Bracket"; and U.S. Design Pat. No. D419,317 patented Jan. 25, 2000 to G. M. Pond et al and assigned to Seats, Inc. on a "Seat"; and U.S. Design Pat. No. D424,414 patented May 9, 2000 to M. P. Ziaylek et al and assigned to Michael P. Ziaylek, Theodore Ziaylek, Jr. and Theodore P. Ziaylek on an "Adjustable Mounting Bracket For A Cylindrical Member"; and U.S. Design Pat. No. D434,495 patented Nov. 228, 2000 to L. J. Whalen et al and assigned to Wheeled Coach Industries, Inc. on an "Oxygen Bottle Holder"; and U.S. Design Pat. No. D480,294 patented Oct. 7, 2003 to T. Ziaylek, Jr. et al on a "Releasable Tank Holding Assembly"; and U.S. Design Pat. No. D494,049 patented Aug. 10, 2004 to M. P. Ziaylek et al on a "Mounting Bracket With Ejection Mechanism For Holding A Cylindrical Tank"; and U.S. Design Pat. No. D494,453 patented Aug. 17, 2004 to M. P. Ziaylek et al on a "Mechanical Locking Bracket For Holding Cylinders".

SUMMARY OF THE INVENTION

The present invention provides a unique configuration for a releasable mounting apparatus which can be used to securely retain a cylindrical tank such as a self-contained breathing apparatus tank in an inverted vertical position adjacent to the seat back assembly of an emergency vehicle such as a fire truck or the like. This apparatus preferably includes a foot plate attached to the seat back assembly with a top clamping assembly also attached with respect to the seat back assembly at a position above the foot plate to define a tank receiving zone therebetween. This tank receiving zone is designed to receive a cylindrical tank positioned therewithin in an inverted orientation extending generally vertically therewithin. The top clamping assembly is preferably adapted to facilitate engaging and retaining of a cylindrical tank positioned within the tank receiving zone. The tank receiving zone is defined below the top clamping assembly and above the foot plate in such a manner that it extends generally vertically therebetween.

This top clamping assembly preferably includes a rear positioning device attached with respect to the seat back assembly and extending outwardly therefrom. The rear positioning device is preferably adapted to abut a cylindrical tank responsive to movement thereof toward the tank receiving zone to facilitate positioning and selective securement thereof within the tank receiving zone. The rear positioning device of the top clamping means is also preferably flexibly resilient to facilitate movement thereof between a compressed position responding to movement of the cylindrical tank into the tank receiving zone and an extended position extending at least partially into the tank receiving zone whenever it is empty. The rear positioning device of the top clamping means preferably also will include one or more rear bumpers mounted and extending outwardly from the abutment surface in order to facilitate retaining of abutting contact thereof with respect to the cylindrical tank while minimizing damaging of the exterior surface of the tank.

The top clamping assembly preferably further includes an upper centering guide member attached to the seat back assembly adjacent the rear positioning and above the tank receiving zone. The upper centering guide member preferably includes a downwardly facing guide surface to facilitate retaining and guiding of movement of a cylindrical tank into and out of the tank receiving zone. The upper centering guide member preferably includes a primary guide section extending generally horizontally which is adapted to extend over the bottom rounded end of a cylindrical tank positioned in an inverted position within the tank receiving zone. Furthermore the upper centering guide member preferably will include first and second guide sections extending outwardly from the primary guide member preferably at oblique angles extending outwardly therefrom wherein the first and second guide sections are spatially disposed from one another to facilitate positioning of the upper centering guide member positioned therebetween.

The top clamping assembly will further preferably include a top clamping member attached with respect to the seat back assembly adjacent the upper centering guide and the rear positioning mechanism such as to be movable between a lower clamping position laterally adjacent the tank receiving zone for securely retaining a cylindrical tank therewithin at an upper releasing position for allowing a cylindrical tank to move into and out of the tank receiving zone. A return biasing means is preferably included which will often but not always include a flexible resilient coil spring wound around the top clamping member and attached with respect to the seat back assembly. It is further attached to the top clamping member for continuously urging movement of the top clamping member toward the lower clamping position in order to facilitate selective securement and retaining of a cylindrical tank within the tank receiving zone by defining the lower clamping position to be the steady state position.

A releasing mechanism is also included in the apparatus of the present invention which is operatively attached with respect to the top clamping member and is selectively operable to urge it to move away from the lower clamping position and toward the upper releasing position to facilitate placement and removal of the cylindrical tank with respect to the tank receiving zone in the inverted position as and when desired.

In an alternative configuration of the present invention the releasable mounting apparatus can include a backing plate which extends generally vertically therewithin with an upper bracket attached to the backing plate which includes a rear panel attached to the backing plate and a first side panel extending outwardly from the rear panel. A second side panel can also be included extending outwardly from the rear panel at a position spatially disposed from the side panel. With the alternative configuration the mechanism of the releasable mounting apparatus is self-contained and can include the foot plate mounted to the backing plate at a lower position therewithin and the top clamping assembly secured to the backing plate at an upper position therewithin to define therebetween the tank receiving zone extending vertically along the backing plate.

It is an object of the present invention to provide a tank holding bracket for positively engaging an inverted tank and facilitating quick release thereof which can be configured as a stand alone mounting bracket or in a manner to be integral with respect to a vehicle seat back.

It is an object of the present invention to provide a tank holding bracket for positively engaging an inverted tank and facilitating quick release thereof which can include three positioning and clamping devices positioned near the upper end thereof to facilitate tank containment.

It is an object of the present invention to provide a tank holding bracket for positively engaging an inverted tank and facilitating quick release thereof which can include a T-shaped resiliently biased positioning mechanism mounted to the backing plate of the bracket with a plurality of rubber bumpers mounted thereof to facilitate exiting of a tank from the tank holding zone when desired.

It is an object of the present invention to provide a tank holding bracket for positively engaging an inverted tank and facilitating quick release thereof which provides a comfortable seat configuration for emergency personnel while confined by a seat belt and/or shoulder harness in an emergency vehicle while wearing an air tank suspended from the person's back.

It is an object of the present invention to provide a tank holding bracket for positively engaging an inverted tank and facilitating quick release thereof which provides a safe and convenient manner of usage.

It is an object of the present invention to provide a tank holding bracket for positively engaging an inverted tank and facilitating quick release thereof which is easily detached from the seat.

It is an object of the present invention to provide a tank holding bracket for positively engaging an inverted tank and facilitating quick release thereof which firmly secures the air tank to the seat while the person is seated.

It is an object of the present invention to provide a tank holding bracket for positively engaging an inverted tank and facilitating quick release thereof which provides a convenient and quick means for release from the seat.

It is an object of the present invention to provide a tank holding bracket for positively engaging an inverted tank and facilitating quick release thereof which firmly holds the tank in place to prevent injury to the wearer which could result from a motor vehicle accident of the emergency vehicle.

It is an object of the present invention to provide a tank holding bracket for positively engaging an inverted tank and facilitating quick release thereof which provides a unique configuration including a rotating block and a specifically constructed release lanyard.

It is an object of the present invention to provide a tank holding bracket for positively engaging an inverted tank and facilitating quick release thereof which allows the tank to be positioned in the tank holding zone or locking zone merely by placing the head of the tank in contact with the base of the bracket and rotating the upwardly facing bottom portion of the tank into the tank holding zone.

BRIEF DESCRIPTION OF THE DRAWINGS

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

DETAILED DESCRIPTION OF THE PREFERRED EMBODIMENT

The present invention covers a unique configuration for a releasable mounting apparatus for securely retaining of a cylindrical tank in an inverted position adjacent to a seat back assembly of an emergency vehicle such as a fire truck or the like. The seat back assembly 12 is shown best in FIG. 1 which includes an open area in the rear portion thereof to facilitate the mounting of a cylindrical tank 10 therewithin. The present invention provides a unique configuration for a mounting apparatus for securely mounting of a cylindrical tank 10 in an inverted position extending vertically within the seat back 12 while also allowing it to be easily and quickly removed to be worn by emergency personnel such as firefighters responsive to arrival at the location of a specific emergency.

Figure 1:
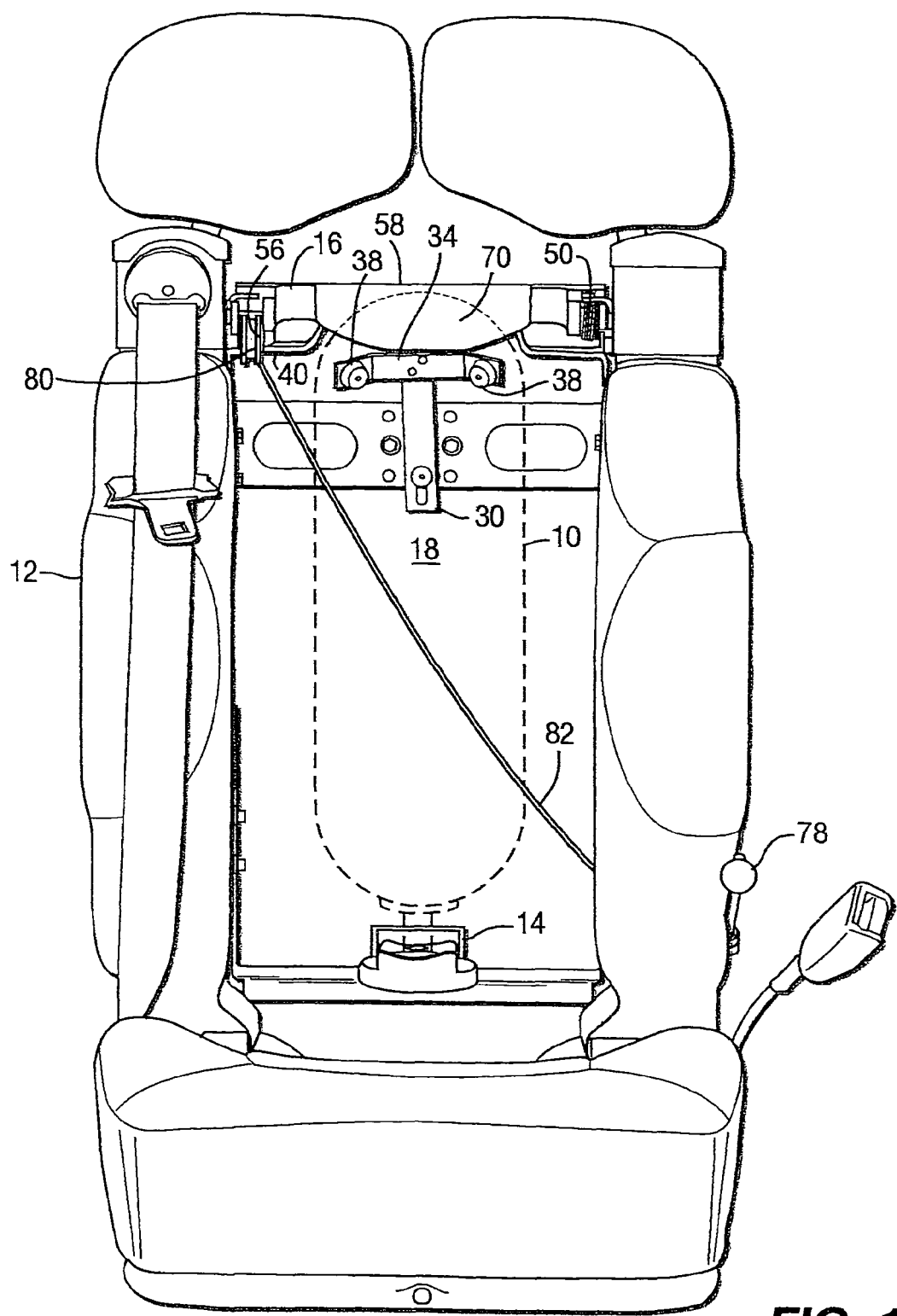
FIG. 1 is a front plan view of an embodiment of the positively engaging mounting apparatus for securely and detachably retaining of a cylindrical tank shown integrally configured with respect to an emergency vehicle seat back.

This mounting apparatus preferably includes a foot plate 14 shown mounted in the lower portion of the seat back 12. A cylindrical tank 10 is shown in FIG. 1 is dotted outline in the inverted orientation. A top clamping assembly 16 will be preferably included. This top clamping assembly will include a rear positioning means 30 and an upper centering guide member 40 as well as a top clamping member 58 and a return biasing means 50 for controlling pivotal movement of the top clamping member 58.

Figure 2:
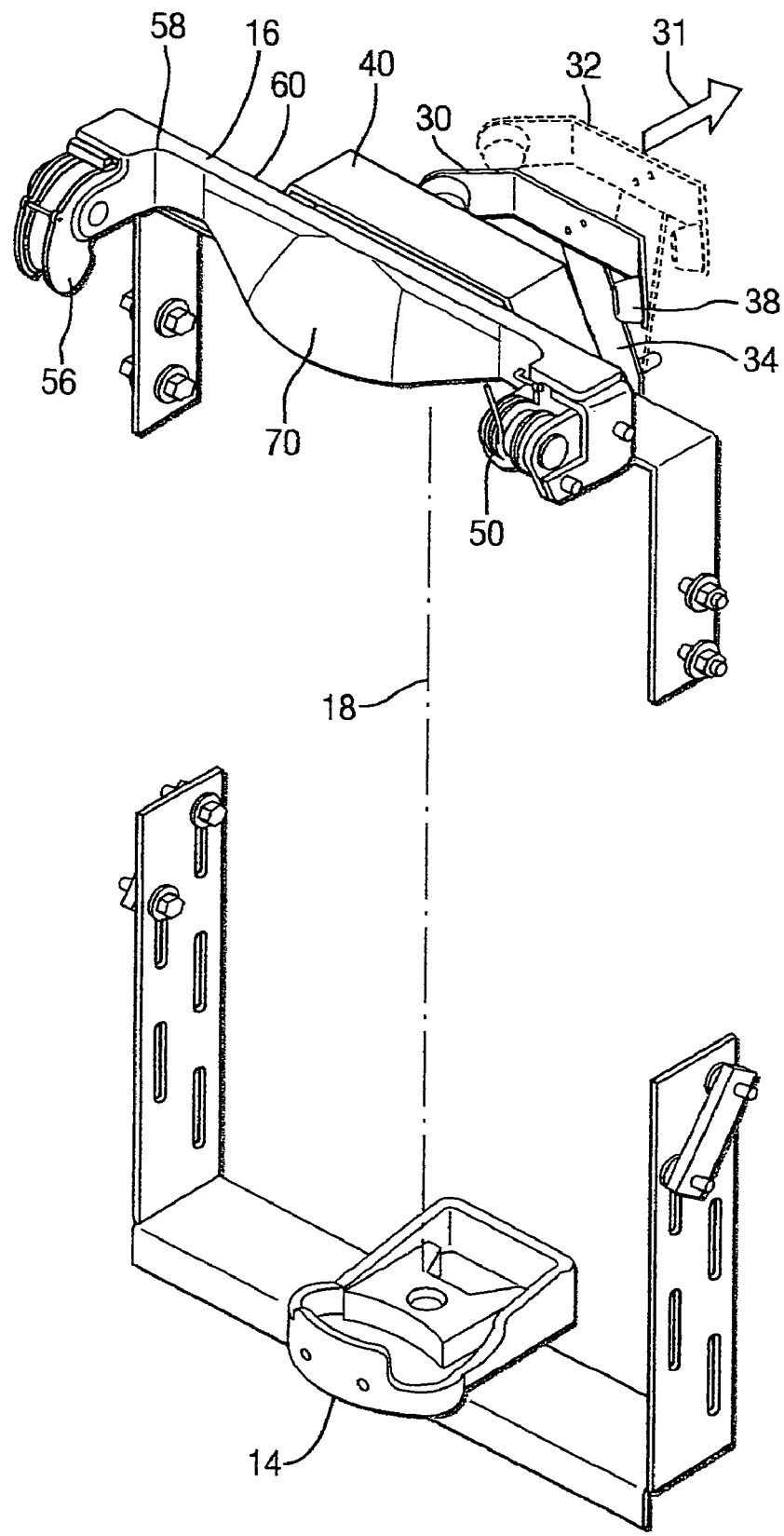
FIG. 2 is a perspective illustration of the embodiment shown in FIG. 1 with the environmental structure of the seat back removed therefrom for clarity.
Figure 3:
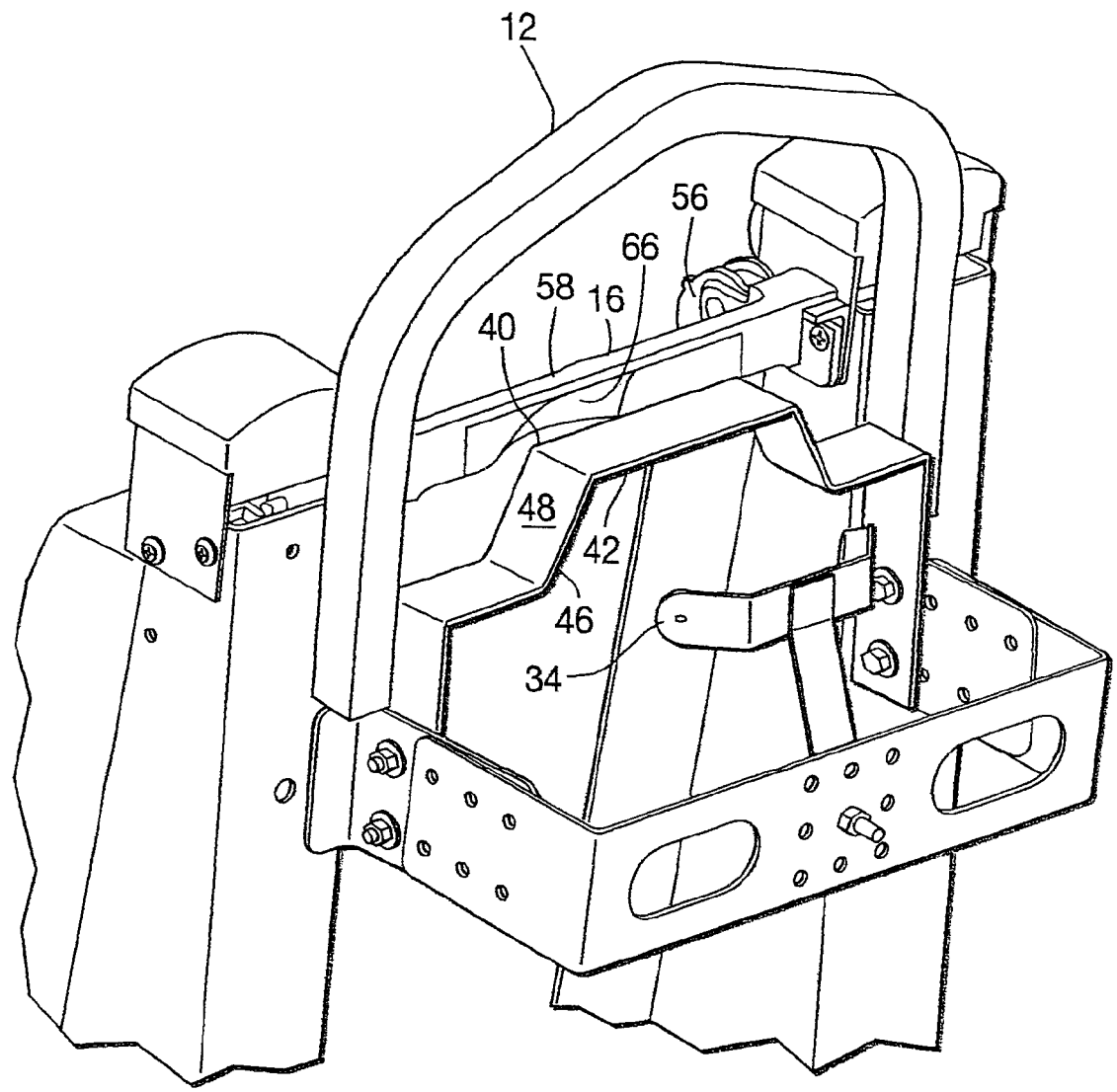
FIG. 3 is a rear perspective view of the embodiment shown in FIG. 1 showing the left rear quarter view.
Figure 4:
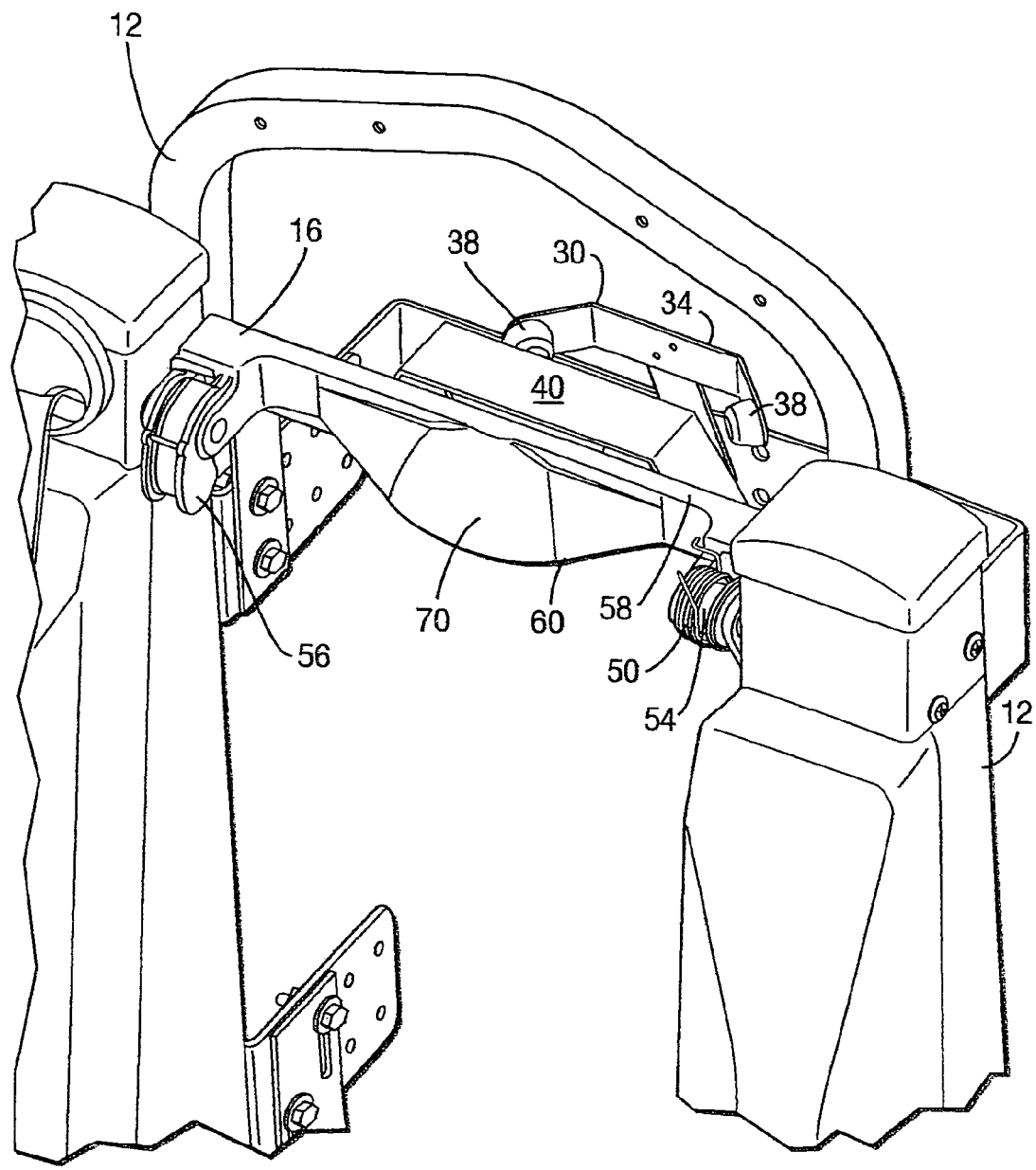
FIG. 4 is an illustration of the embodiment shown in FIG. 1 showing a close-up of the upper portion in perspective.
Figure 5:
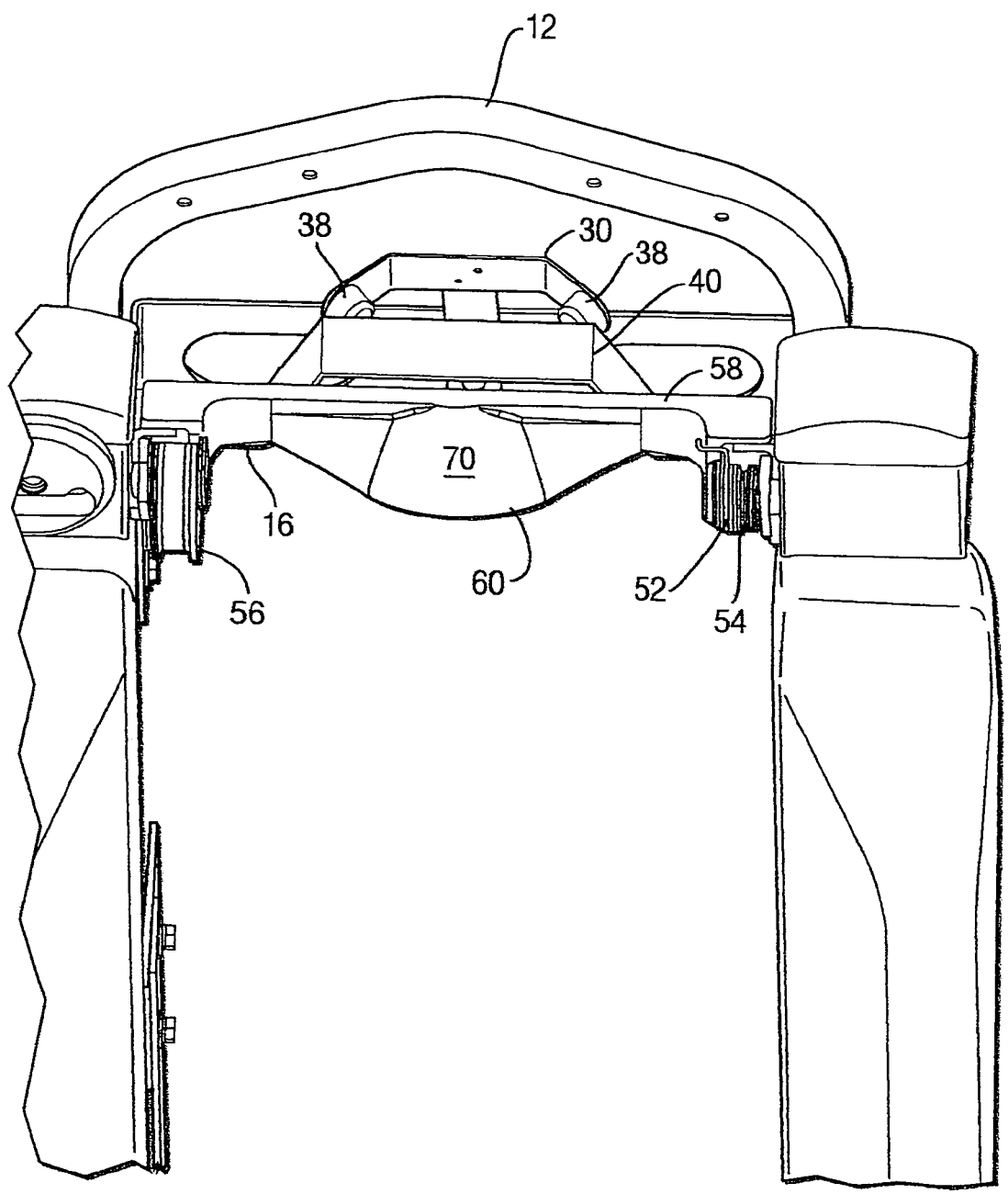
FIG. 5 is a front upper plan view illustrating the upper portion of the present invention as shown in FIG. 1.
Figure 6:
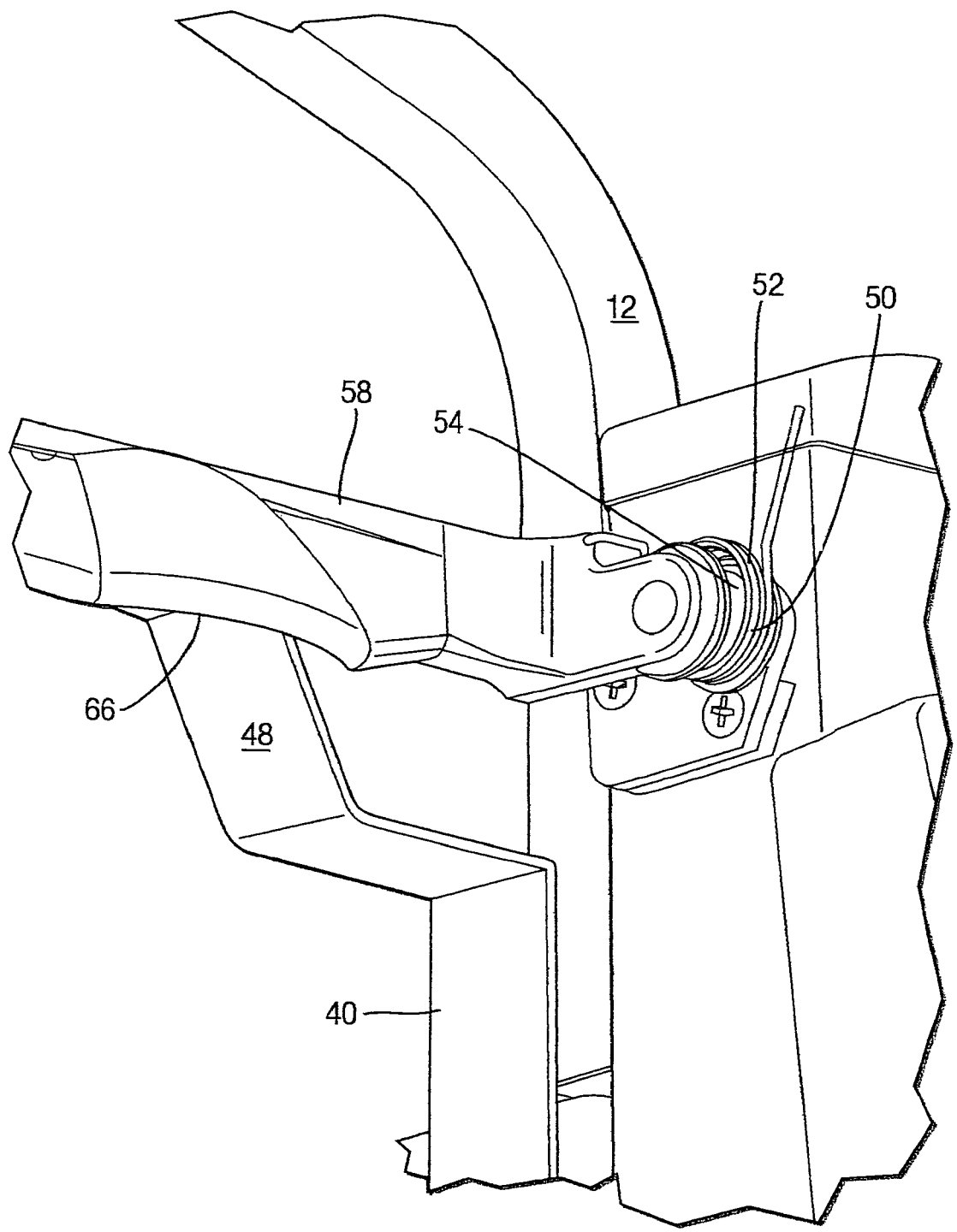
FIG. 6 is an extremely close view showing the embodiment of FIG. 1 and in particular illustrating the return biasing means utilizing a coiled spring configuration.
Figure 7:
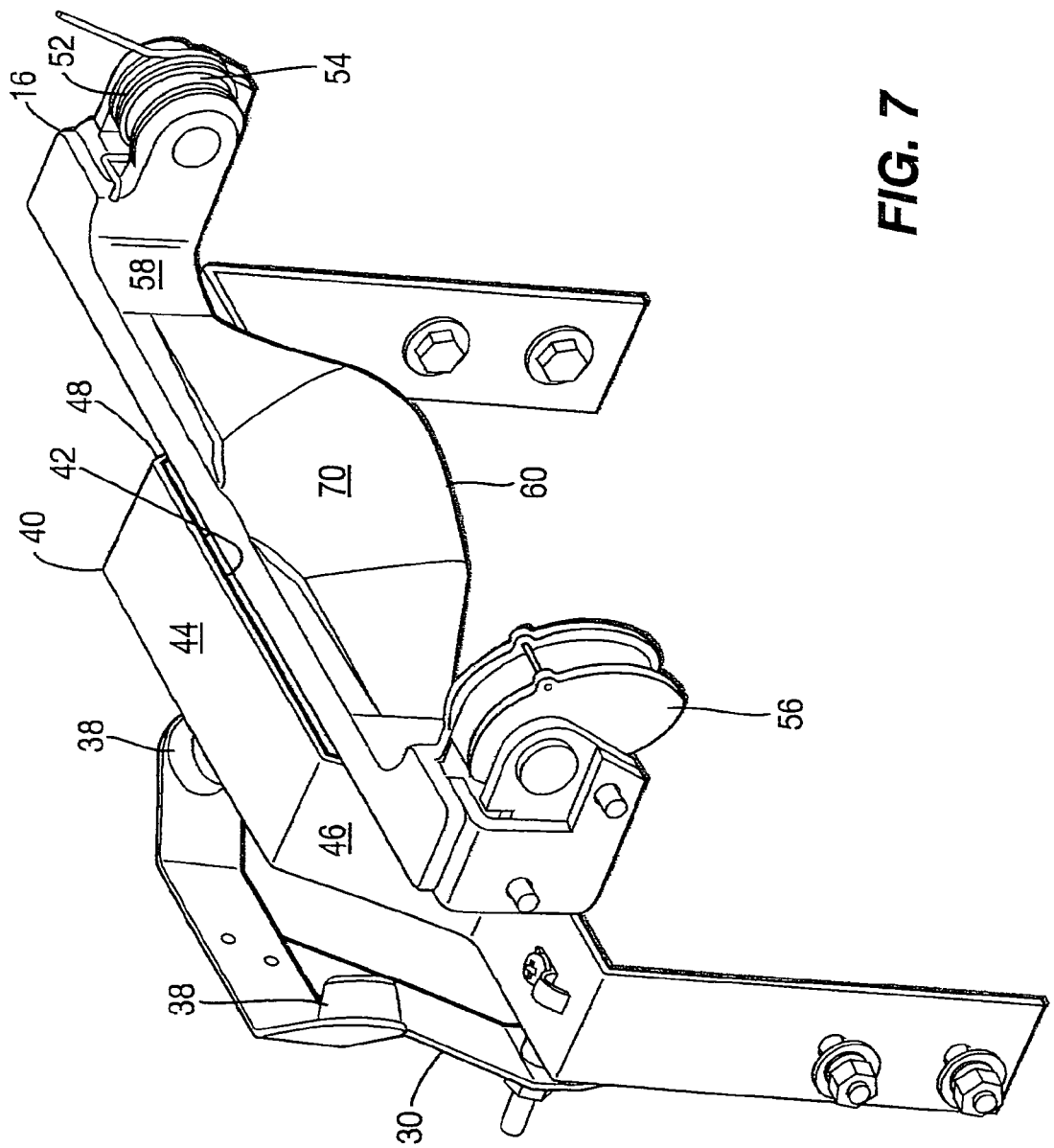
FIG. 7 is a close-up illustration of the embodiment shown in FIG. 2 illustrating solely the configuration of the top clamping assembly means thereof.

The rear positioning means 30 will preferably include a rear abutment surface 36 which is adapted to contact the back portion of a cylindrical tank 10 as it is moved into the tank receiving zone 18. Tank receiving zone 18 is defined as the area extending between the top clamping assembly means 16 and the foot plate 14. Foot plate 14 is adapted to mount the neck area of the inverted tank and the top clamping assembly means 16 is designed to engage the rounded bottom portion of the cylindrical tank 10 which faces upwardly when the tank is mounted in the inverted orientation. In this manner a tank can be retained in an inverted manner extending vertically from the foot plate 14 up to the top clamping assembly 16 extending through the tank receiving zone 18. The rear positioning means will preferably be compressible such as to be movable from an extended position 34 wherein it extends at least partially into the tank receiving zone 18 and the compressed position 32. Compressed position 32 is shown best in dotted outline in FIG. 2 and the extended position 34 is shown in solid line in FIG. 2.

As the tank moves rearwardly toward the stored position in the tank receiving zone 18 it will come in contact initially with the rear abutment surface 36 of the rear positioning means 30 which will be positioned in the extended position 34. The rear positioning means 30 will then be compressed rearwardly and will move toward the compressed position 32 as the cylindrical tank 10 reaches the final position for storage within the tank receiving zone 18. The movement of the rear positioning means 30 from the extended position 34 to the compressed position 32 will be achieved by movement along the directional arrow 31 as shown best in FIG. 2. Arrow 31 represents the direction of compressing movement of the rear positioning means 30 from the extended position 34 toward the compressed position 32. To minimize damaging of the exterior surface of the cylindrical tank 10 one or more rear bumper means 38 can be positioned extending outwardly from the rear abutment surface 36 of rear positioning means 30 to facilitate accurate abutment and minimize damaging of the tank exterior surface.

The present invention will preferably further include an upper centering guide member 40 which preferably includes a downwardly facing guide surface 42 which is generally shaped in an arcuate manner or concave manner facing downwardly to urge the rounded bottom of the cylindrical tank 10 into accurate alignment and positioning within the tank receiving zone 18. The upper centering guide member 40 preferably includes a primary guide section 44 extending generally horizontally and a first guide side section 46 extending downwardly and outwardly therefrom. A second guide side section 48 will also extend downwardly and outwardly from the primary guide section 44 at a position spatially disposed from the first guide side section 46. Preferably both the first guide side section 46 and the second guide side section 48 will be oriented at oblique angles with respect to the primary guide section 44 to facilitate defining of the generally concave shaped downwardly facing guide surface 42. In this manner the upper centering guide member 40 will aid in preventing the cylindrical tank 10 from being dislodged from accurate positioning within the tank receiving zone 18.

One of the most important characteristics of the present invention is in the configuration of the top clamping member 58 and associated operating parts. The top clamping member 58 preferably is movable between a lower clamping position 60 where it engages the cylindrical tank 10 for firmly and securely moving it toward the tank receiving zone 18 and for firmly securing of it within the tank receiving zone 18 and an upper releasing position 64 which allows a tank to be placed within the tank receiving zone 18 or removed therefrom. Thus, this movement of the top clamping member 58 between the lower clamping position 60 and the upper releasing position 64 is the important movement utilized for positively engaging the cylindrical tank 10 within the tank receiving zone 18 while facilitating removal or replacement thereof. As such, the top clamping member 58 is preferably movable and further preferably pivotable with respect to the seat back assembly 12 to move between the two positions 60 and 64 thereof.

When the top clamping member 58 is positioned in the lower clamping position 60 a tank retaining surface 66 which is generally concave will be defined thereupon adapted to engage and gently urge the cylindrical tank 10 toward the tank receiving zone 18 and will also aid in retaining of the tank 10 within zone 18. This surface is generally concave and can include a layer of tank retaining protective material 68 such as a plastic or rubber coating thereover for the purpose of protecting the exterior surface of the cylindrical tank 10 from any damaging thereof caused by abutment and urging of movement thereof by the concave tank retaining surface 66 of the top clamping member 58.

The steady state position of the top clamping member 58 will be the lower clamping position 60. This position 60 is configured as the steady state position because of the inclusion of a return biasing means 50 and the specific configuration thereof. Return biasing means 50 is designed to exert a continuous bias on the top clamping member 58 for urging movement thereof toward the lower clamping position 60. This return biasing means 50 preferably is configured as a flexibly resilient spring means and in particular a flexibly resilient coil spring means 52 which can be wound about a circumferential biasing boss 54 defined on the top clamping member 58. Boss 54 will contain the coil spring 52 therewithin and the coil spring will be attached with respect to the seat back assembly 12 and also attached with respect to the top clamping member 58 for the purpose of exerting a continuous force thereagainst tending to urge the top clamping member 58 toward the steady state lower clamping position 60.

The basic construction of the apparatus of the present invention requires that the top clamping member 58 be movable toward the upper releasing position 64 at times in order to allow movement of the cylindrical tank into the tank receiving zone 18 or for removal of the tank 10 from zone 18.

During normal placement of the cylindrical tank 10 into the tank receiving zone 18 the neck or lower portion of the tank will be place within the foot plate 10. The foot plate 10 will then be used as the pivot point wherein the bottom of the cylindrical tank 10 which is facing upwardly from the foot plate 14 will then be moved into engagement with respect to the top clamping member 58 and in particular with respect to a tank placement surface 70 defined thereon. This tank placement surface 70 is preferably a convex surface and because it will be brought into contact with the cylindrical tank 10 will preferably include a layer of tank placement protective material 72 extending thereover for protecting the surface of the exterior of the cylindrical tank 10. As the cylindrical tank 10 is urged toward the preferably convex tank placement surface 70 a bias will be exerted against the top clamping member 58 for urging thereof to move toward the upper releasing position 64. As greater and greater force is applied against the cylindrical tank 10 pivoting about the foot plate 14 the top clamping member 58 will be caused to rotate toward the upper releasing position 64. This force is enhanced by the configuration of the tank placement surface 70 on top clamping member 58 to be of a convex shape.

As the top clamping member 58 rotates toward the upper releasing position 64 ultimately enough clearance vertically above the bottom end of the cylindrical tank 10 will be created allowing the tank 10 to rotate therepast for positioning immediately within the tank receiving zone 18. As the cylindrical tank 10 extends fully into the tank receiving zone 18, it will disengage from contact with the tank retaining surface 66 thereby allowing the top clamping member 58 to return to the lower clamping position 60 due to the force exerted thereupon by the return biasing means 50. As such, the top clamping member 58 will move to a position wherein the concave tank retaining surface 66 will be brought into contact with the exterior surface of the cylindrical tank 10 in such a manner as to cause it to be firmly secured and retained within the tank receiving zone 18 thereby.

An alternative means for urging movement of the top clamping member 58 towards the upper releasing position 64 is provided by the present invention by the inclusion of a releasing means 76. Releasing means 76 includes a releasing cable 78 which includes two main members. The first member is the outer sheath member 82 and the internal cable member 80. Internal cable member 80 is longitudinally movable within the external sheath 82. The internal cable member 80 is secured to the top clamping member 58 and the outer sheath 82 is secured with respect to the seat back assembly 12. As such, with this construction when the user pulls on the internal cable 80, it will move within the outer sheath member 82 and urge the top clamping member 58 to move from the lower clamping position 60 toward the upper releasing position 64. This cable-type releasing mechanism is used primarily for removal of the cylindrical tank 10 from the tank receiving zone 18. To facilitate this movement an eccentric cam arm 56 can extend outwardly from the top clamping member 58 for the purpose of providing additional leverage if needed at the point of connection between the internal cable member 80 and the top clamping member 58 to ease the force required for urging of the top clamping member 58 toward the upper releasing position 64 responsive to pulling on the internal cable member 80.

Control of movement of the top clamping member 58 between the lower clamping position 60 and the upper releasing position 64 is an important characteristic of the present invention. As such, it is important that the movement of the top clamping member 58 to the lower clamping position 60 include a stopping means 62 to prevent movement of the top clamping member 58 beyond the lower clamping position 60. This stopping means 62 will preferably include tabs 84 which extend outwardly from the top clamping member 58 and are movable therewith such that they are caused to engage ears 74 preferably defined on the seat back assembly 12 of the present invention. When the tabs 84 engage the ears 74 the force exerted by the return biasing means 50 will no longer be able to cause any actual movement of the top clamping member 58 and thus it will be halted in the correct position defined as the lower clamping position 60.

Figure 8:
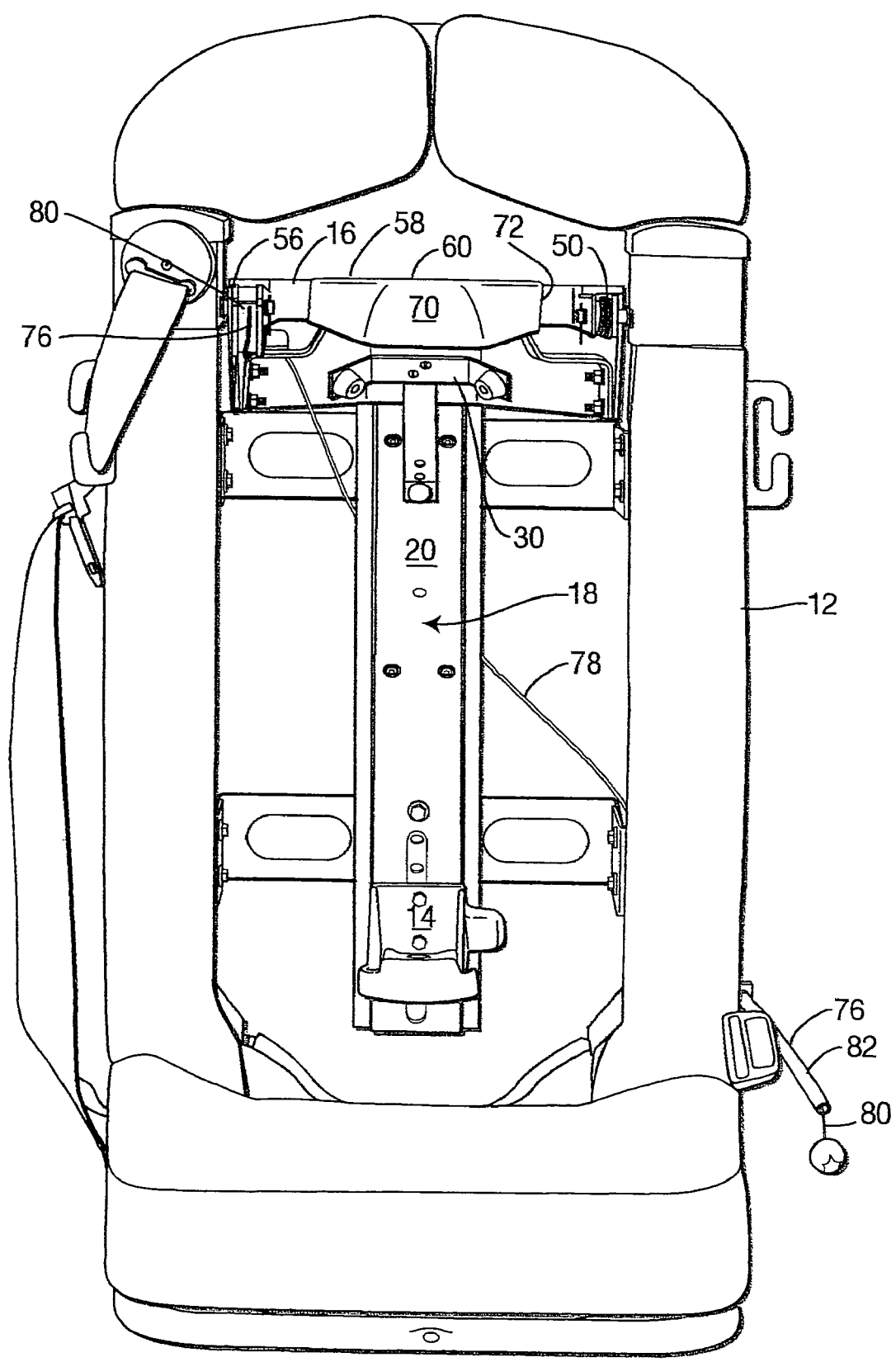
FIG. 8 is a front plan view of an alternative embodiment of the positively engaging mounting apparatus for securely and detachably retaining of a cylindrical tank of the present invention showing positioning of the self-contained or stand alone unit mounted within a seat back with the seat back shown.
Figure 9:
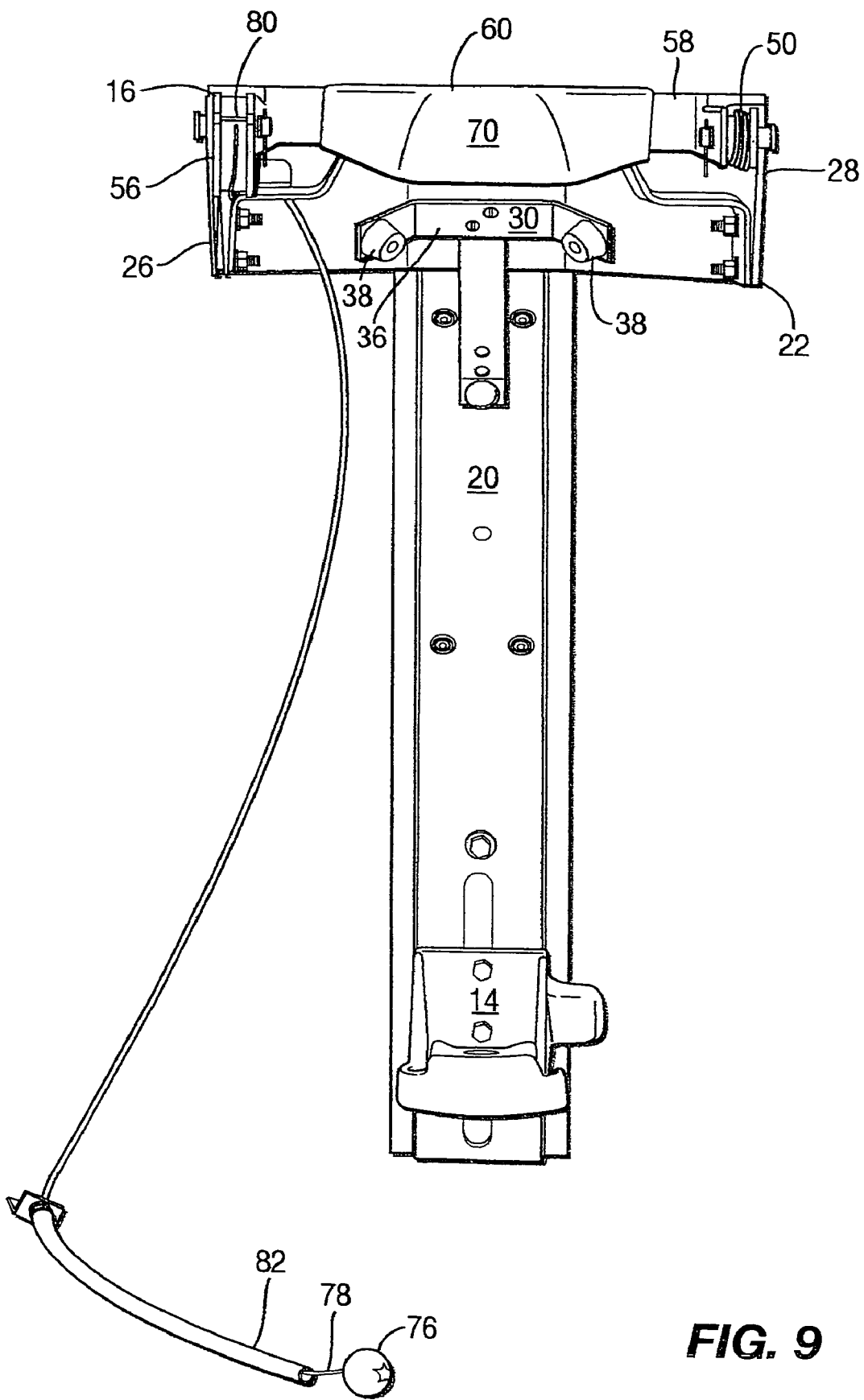
FIG. 9 is an illustration of the embodiment shown in FIG. 8 with the environmental structure of the seat back removed for clarity.
Figure 10:
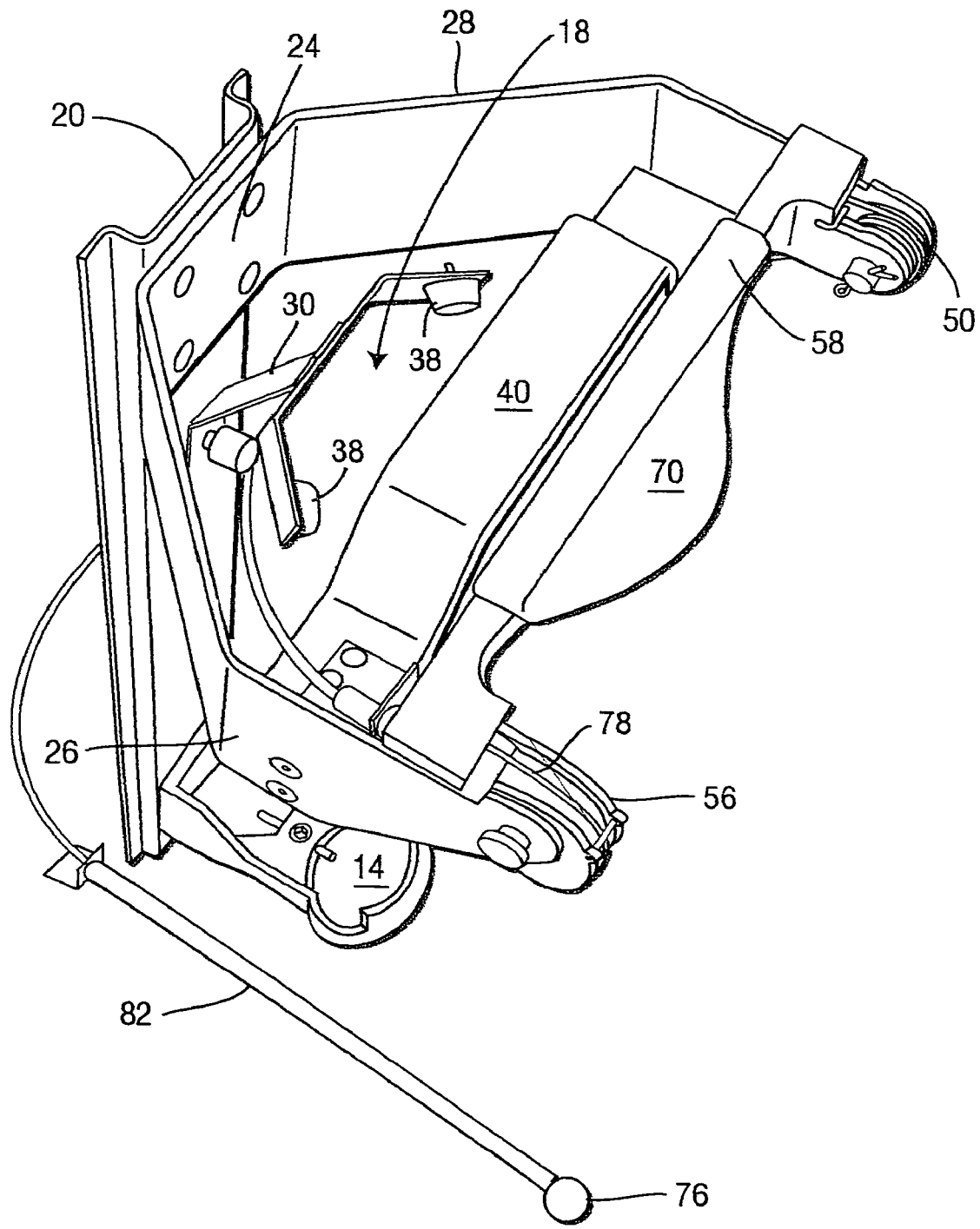
FIG. 10 is a perspective view from the upper left of the configuration shown in FIG. 9.
Figure 11:
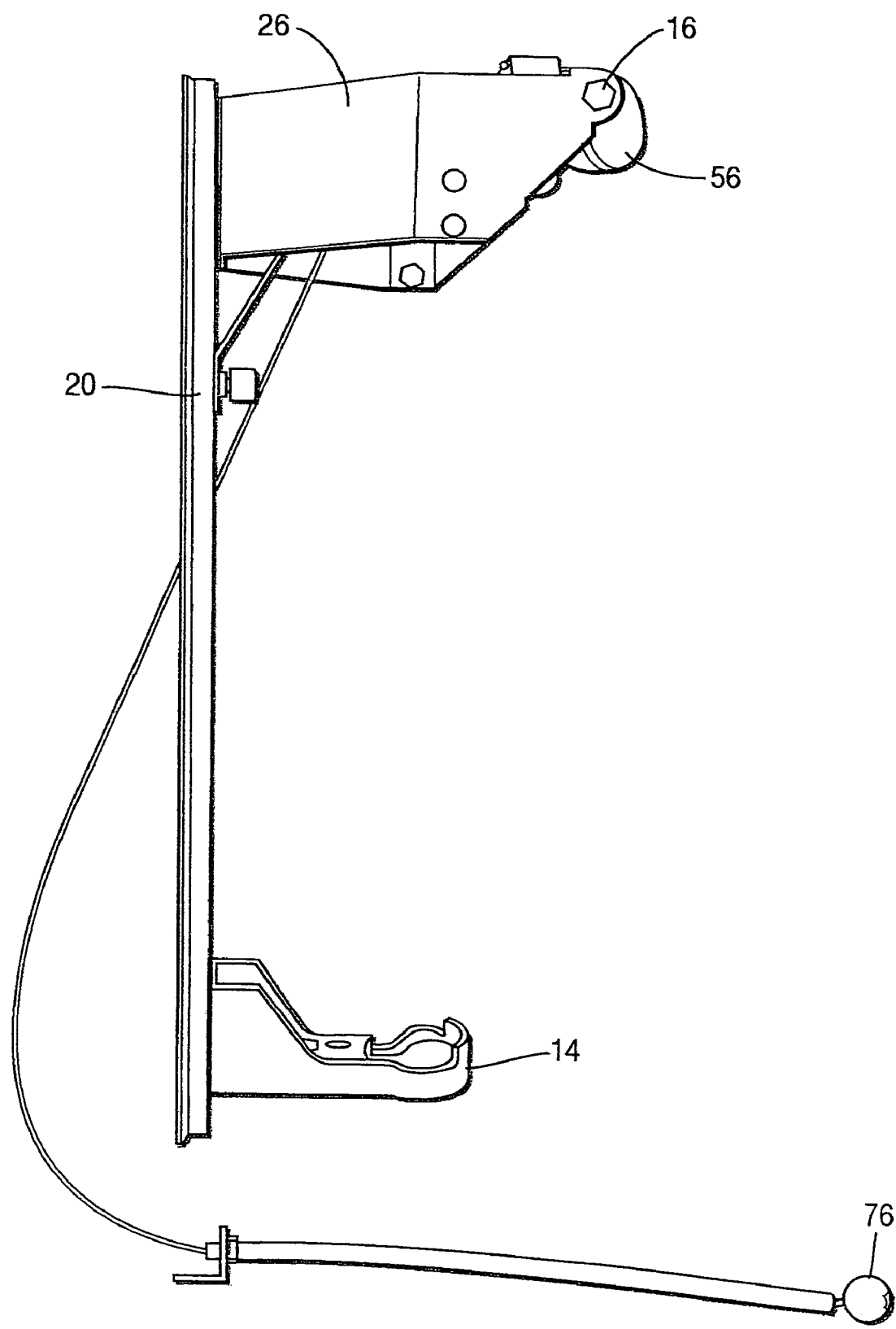
FIG. 11 is a side plan view of the configuration shown in FIG. 9 as viewed from the left.
Figure 12:
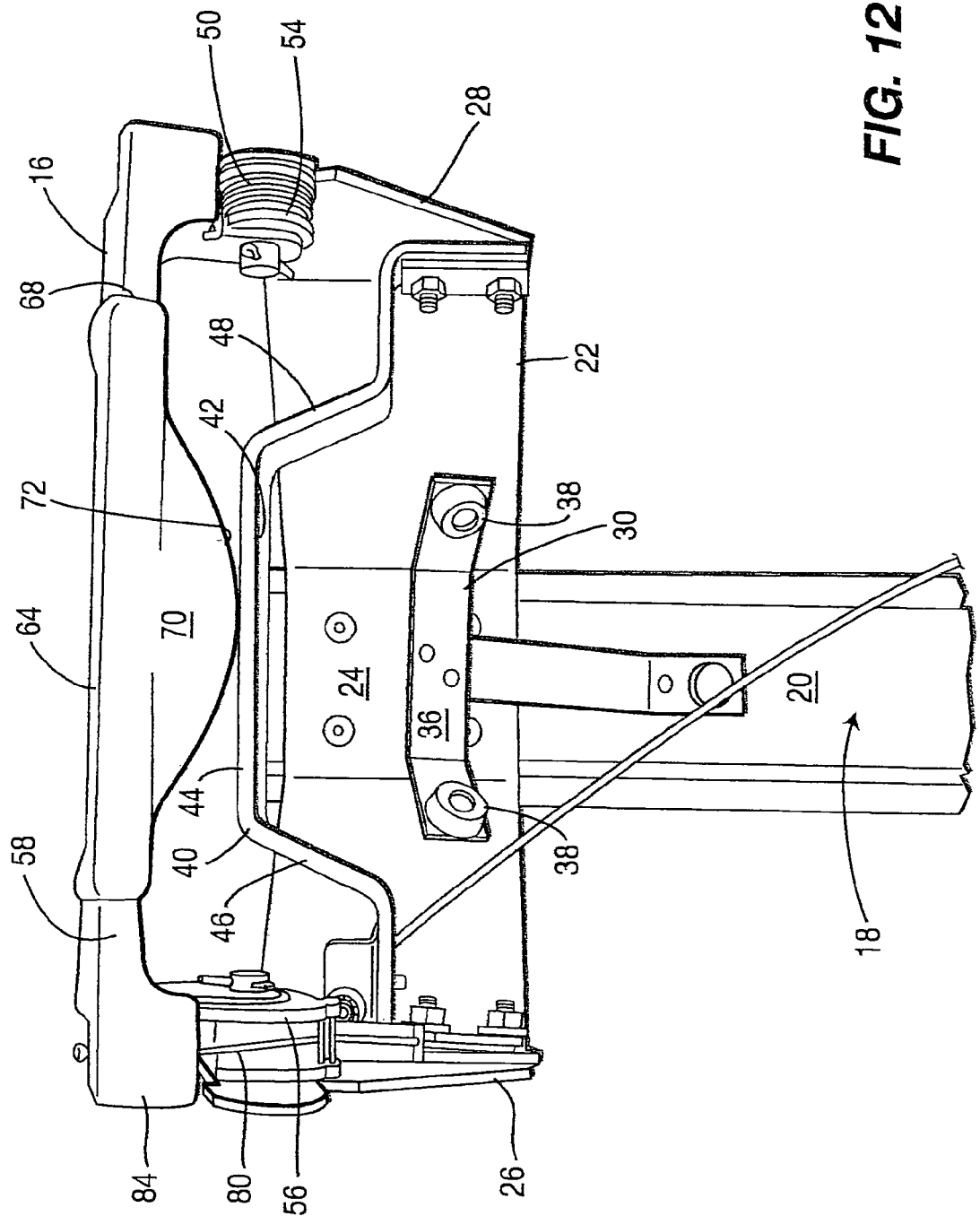
FIG. 12 is an exploded front plan view of the alternative embodiment shown in FIG. 1 with the top clamping member shown in the upper releasing position.
Figure 13:
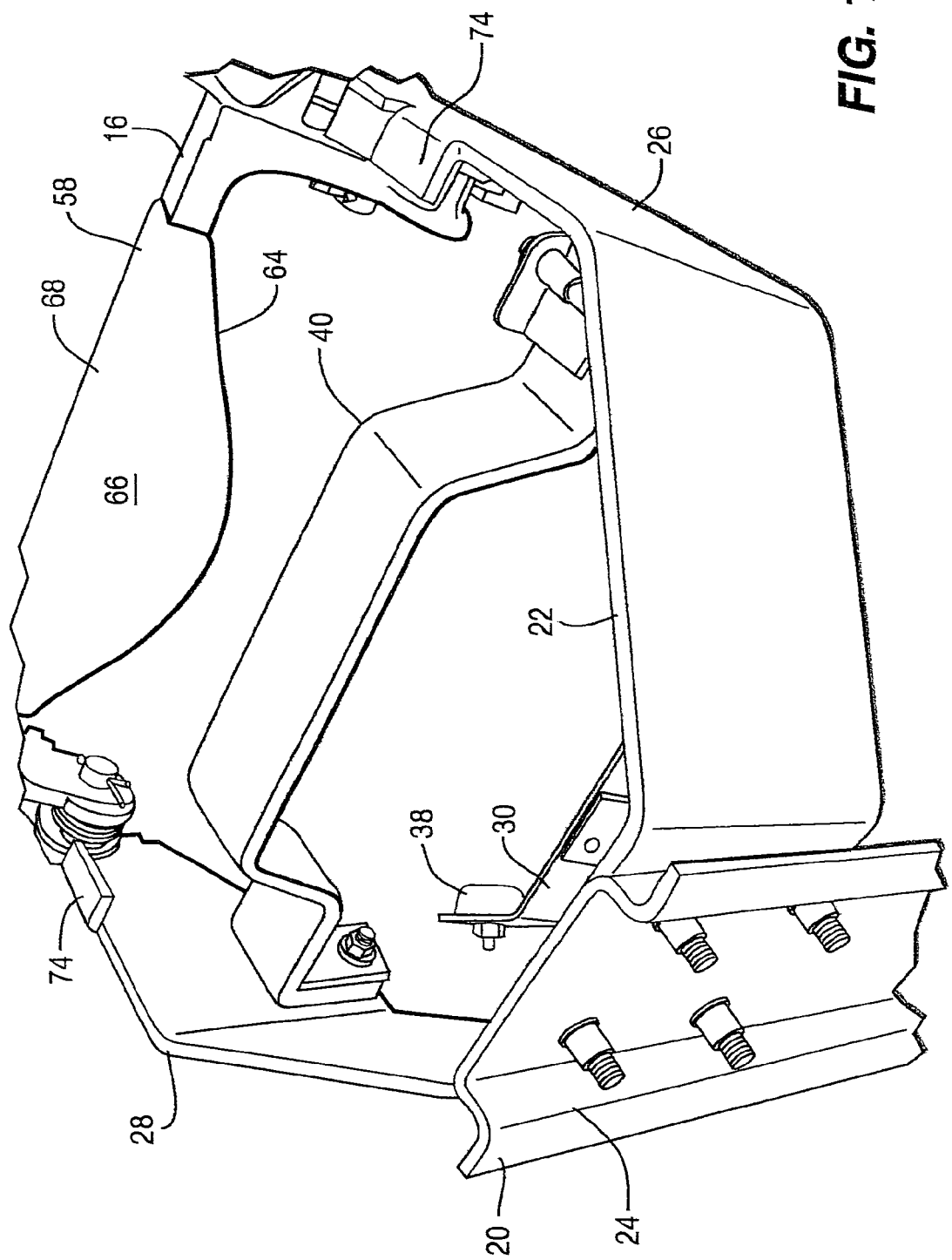
FIG. 13 is a perspective illustration shown from the rear quarter of the embodiment of FIG. 9 with the top clamping member shown in the releasing position.
Figure 14:
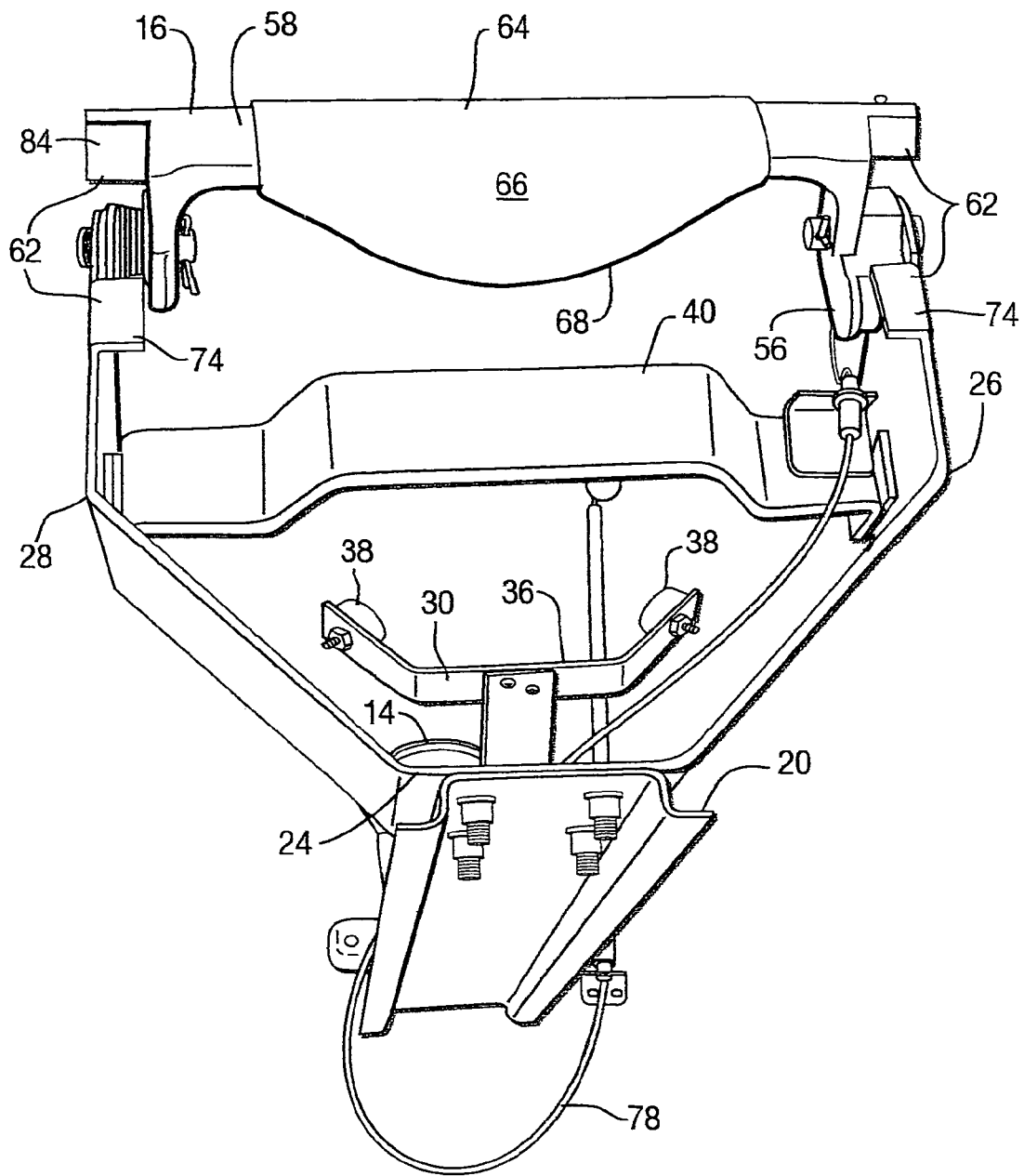
FIG. 14 is a top plan view of the embodiment shown in FIG. 13 with the top clamping member shown in the releasing position.

One of the configurations of the present invention is shown in FIG. 1 wherein the various aspects of the mounting bracket of the present invention as shown mounted as integral elements with respect to a seat back assembly 12. These are often assembled at the time of assembly of the seat back and are placed in a new vehicle when delivered. An important alternative configuration for the apparatus of the present invention is in a stand alone unit or self-contained unit shown in FIGS. 8-14. This stand alone device will include a backing plate 20 standing vertically between the top clamping assembly 16 and the foot plate therebelow such as to define the tank receiving zone 18 to extend vertically along the backing plate. With this configuration it is preferable to include an upper bracket means 22 which includes a rear panel 24 attached to the backing plate 20. The upper bracket 22 will also include a first side panel 26 extending outwardly from the rear panel 24 and a second side panel 28 also secured to the rear panel 24 at a position spatially disposed from the first side panel 26 and extending outwardly therefrom. This backing plate will allow usage of the apparatus of the present invention with various different configurations of seat backs and can be utilized as an after market add-on if needed but also could be used as original factory equipment. The upper bracket provides the side panels to which the top clamping member 58 can be pivotally movably attached and can also provide means for attaching other portions of the top clamping assembly 16 such as the upper centering guide member 40 and the rear positioning means 30. This construction is shown positioned in a seat back in FIG. 8 but is shown in front view without the seat back for the purposes of clarity in the other FIGS. 9-14.

One of the most important aspects of the apparatus of the present invention is the operation of the top clamping assembly 16 responsive to hard braking or deceleration of the emergency vehicle. Normally, each individual seatback assembly 12 mounted within an emergency vehicle such as a fire truck or the like will be oriented facing forwardly similar to positioning of most conventional seating in any standard vehicle. These types of emergency vehicles are often driven very aggressively when responding to emergency situations where a quick response time is critical. As such, the emergency vehicles so equipped often experience hard braking or rapid deceleration which can be dangerous to the emergency personnel seated within the passenger compartment against the seatback assemblies 12 where each individual cylindrical tank 10 is positioned. It is important that under such conditions of such hard braking or deceleration that the tanks 10 be retained securely.

When hard braking or deceleration occurs a cylindrical tank 10 retained within the tank receiving zone 18 will be subjected to significant forces of inertia orientated longitudinally and forwardly along the direction of vehicle travel. These forces will tend to urge the cylindrical tank 10 to move forwarding within the passenger cabin of the emergency vehicle. Thus these forces will cause a cylindrical 10 retained in a seatback assembly 12 to try to move forwardly into abutting contact with respect to the rearwardly facing side of the top clamping member 58 which is oriented facing the tank receiving zone 18. With the construction of present invention, this forwardly directed force of inertia will tend to urge the top clamping member 58 to want to move more completely into the lower clamping position 60 by increasing the force of engagement of the stopping means 62 by increasing the force of engagement between the ears 74 and the tabs 84. Thus, it should be appreciated that hard braking or deceleration of the emergency vehicle will tend to more securely retain the cylindrical tank 10 within the tank receiving zone 18 due to the longitudinally directed forces of inertial being exerted against tank 10. The direction of movement of the top clamping member 58 for tank release is oppositely oriented relative rearwardly relative to the forwardly direction of movement urged by the inertial forces exerted upon a cylindrical tank 10 while positioned retained within the tank receiving zone 18 of the present invention.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

I claim:

1. A releasable mounting apparatus for securely retaining of a cylindrical tank in an inverted vertical position adjacent to a seatback assembly of an emergency vehicle comprising:
   A. a foot plate attached to a seatback assembly of an emergency vehicle;
   B. a top clamping assembly means attached with respect to the seatback assembly as a position above said foot plate to define a tank receiving zone therebetween which is adapted to receive a cylindrical tank positioned therewithin in an inverted orientation extending generally vertically, said top clamping assembly means being adapted to facilitate engaging and retaining a cylindrical tank positioned within said tank receiving zone, said tank receiving zone being defined below said top clamping assembly means and above said foot plate and extending generally vertically therebetween, said top clamping assembly means including:
      (1) a rear positioning means attached with respect to the seatback assembly and extending outwardly therefrom, said rear positioning means being adapted to abut a cylindrical tank responsive to movement thereof toward said tank receiving zone to facilitate positioning and selective securement thereof within said tank receiving zone;
      (2) an upper centering guide member attached with respect to the seatback assembly adjacent said rear positioning means and above said tank receiving zone, said upper centering guide member including a downwardly facing guide surface to facilitate retaining and guiding of movement of a cylindrical tank into and out of said tank receiving zone;
      (3) a top clamping member attached with respect to the seatback assembly adjacent said upper center guide means and said rear positioning means and being movable between a lower clamping position laterally adjacent said tank receiving zone for securely retaining a cylindrical tank therewithin and an upper releasing position for allowing of a cylindrical tank to move into and out of said tank receiving zone;
      (4) a return biasing means attached to said top clamping member for urging movement of said top clamping member toward said lower clamping position to facilitate selective secure retaining of a cylindrical tank within said tank receiving zone; and
   C. a releasing means operatively attached with respect to said top clamping member and being selectively operative to urge said top clamping member to move away from said lower clamping position and toward said upper releasing position to facilitate placement and removal of the cylindrical tank with respect to said tank receiving zone as desired.

2. A releasable mounting apparatus for securely retaining of a cylindrical tank in an inverted vertical position adjacent to a seatback assembly of an emergency vehicle as defined in claim 1 further comprising a backing plate extending generally vertically wherein said foot plate is mounted to said backing plate, said top clamping assembly means also being attached with respect to said back plate at a position spatially disposed above said foot plate to facilitate defining of said tank receiving zone extending therebetween.

3. A releasable mounting apparatus for securely retaining of a cylindrical tank in an inverted vertical position adjacent to a seatback assembly of an emergency vehicle as defined in claim 2 further comprising an upper bracket means attached to said backing plate which includes:
   (1) a rear panel attached to said backing plate;
   (2) a first side panel extending outwardly from said rear panel; and
   (3) a second side panel extending outwardly from said rear panel at a position spatially disposed from said first side panel, said top clamping assembly being mounted to said first side panel and said second side panel to facilitate positioning and operation thereof while aiding in defining of said tank receiving zone extending downwardly therefrom toward said foot plate.

4. A releasable mounting apparatus for securely retaining of a cylindrical tank in an inverted vertical position adjacent to a seatback assembly of an emergency vehicle as defined in claim 3 wherein said rear positioning means of said top clamping assembly means includes a rear abutment surface which is adapted to be abutted by a cylindrical tank while extending at least partially therearound during movement thereof into said tank receiving zone to facilitate engagement therebetween, and wherein said rear positioning means is flexibly urged toward said compressed position responsive to movement of the cylindrical tank into the tank receiving zone while in engagement with and while abutting said rear abutment surface of said rear positioning means.

5. A releasable mounting apparatus for securely retaining of a cylindrical tank in an inverted vertical position adjacent to a seatback assembly of an emergency vehicle as defined in claim 4 wherein said rear positioning means of said top clamping assembly means includes a rear bumper means mounted to said abutment surface thereof to facilitate maintaining of abutting contact thereof with respect to the cylindrical tank minimizing damaging thereof.

6. A releasable mounting apparatus for securely retaining of a cylindrical tank in an inverted vertical position adjacent to a seatback assembly of an emergency vehicle as defined in claim 3 wherein said top clamping member includes a stopping means extending outwardly therefrom which is adapted to engage a portion of said upper bracket means responsive to pivotal movement thereof to said lower clamping position for retaining of said top clamping member in the steady state position in engagement therewith.

7. A releasable mounting apparatus for securely retaining of a cylindrical tank in an inverted vertical position adjacent to a seatback assembly of an emergency vehicle as defined in claim 6 wherein any force exerted by abutment of a cylindrical tank while positioned within said tank receiving zone against said top clamping member of said top clamping assembly means will urge movement thereof toward said lower clamping position to further facilitate retaining of the cylindrical tank secured in place within said tank receiving zone by further urging engagement of said stopping means into contact with a portion of said upper bracket means.

8. A releasable mounting apparatus for securely retaining of a cylindrical tank in an inverted vertical position adjacent to a seatback assembly of an emergency vehicle as defined in claim 1 wherein said rear positioning means of said top clamping assembly means is flexibly resilient to facilitate movement thereof between a compressed position responsive to movement of a cylindrical tank into said tank receiving zone and an extended position extending at least partially into said tank receiving zone responsive to said tank receiving zone being empty.

9. A releasable mounting apparatus for securely retaining of a cylindrical tank in an inverted vertical position adjacent to a seatback assembly of an emergency vehicle as defined in claim 1 wherein said upper centering guide member of said top clamping assembly means includes;
  A. a primary guide section extending generally horizontally and adapted to extend over the bottom end of a cylindrical tank positioned inverted in said tank receiving zone;
  B. a first side guide section attached to said primary guide member and extending obliquely outwardly and downwardly with respect thereto to extend over the lateral lower side of a cylindrical tank positioned inverted in said tank receiving zone; and
  C. a second side guide section attached to said primary guide member at a position spatially disposed from said first side guide section and extending obliquely outwardly and downwardly with respect to said primary guide section, said second side guide section adapted to extend over the lateral lower side of a cylindrical tank positioned inverted in said tank receiving zone at a position spatially disposed from said first side guide section.

10. A releasable mounting apparatus for securely retaining of a cylindrical tank in an inverted vertical position adjacent to a seatback assembly of an emergency vehicle as defined in claim 9 wherein said first guide section and said primary guide section are oriented at an oblique angle with respect to one another to facilitate guiding and retaining of a cylindrical tank with respect to said tank receiving zone, and wherein said second guide section and said primary guide section are oriented at an oblique angle with respect to one another to further facilitate guiding and retaining of a cylindrical tank with respect to said tank receiving zone.

11. A releasable mounting apparatus for securely retaining of a cylindrical tank in an inverted vertical position adjacent to a seatback assembly of an emergency vehicle as defined in claim 1 wherein said return biasing means of said top clamping assembly means is operative to continuously exerting a bias against said top clamping member for continuous urging thereof toward said lower clamping position to establish said lower clamping position as the steady state position thereof.

12. A releasable mounting apparatus for securely retaining of a cylindrical tank in an inverted vertical position adjacent to a seatback assembly of an emergency vehicle as defined in claim 1 wherein said return biasing means comprises a spring means adapted to continuously urge said top clamping member of said top clamping assembly means toward said lower clamping position to facilitate removable retaining of a cylindrical tank in an inverted vertical position within said tank receiving zone.

13. A releasable mounting apparatus for securely retaining of a cylindrical tank in an inverted vertical position adjacent to a seatback assembly of an emergency vehicle as defined in claim 12 wherein said spring means comprises a flexibly resilient coil spring wound around said top clamping member and attached with respect to the seatback assembly to facilitate continuous urging of the said clamping member toward said lower clamping position.

14. A releasable mounting apparatus for securely retaining of a cylindrical tank in an inverted vertical position adjacent to a seatback assembly of an emergency vehicle as defined in claim 1 wherein said top clamping member includes a circumferential biasing boss extending therearound within which said flexibly resilient coil spring is positioned to facilitate retaining thereof with respect to said top clamping member and for enhancing operative continuous biased of said top clamping member toward said lower clamping position.

15. A releasable mounting apparatus for securely retaining of a cylindrical tank in an inverted vertical position adjacent to a seatback assembly of an emergency vehicle as defined in claim 1 wherein said top clamping member defines a tank retaining surface positionable adjacent said tank receiving zone and being adapted to be brought into abutting engagement with respect to a cylindrical tank positioned within said tank receiving zone responsive to movement of said top clamping member toward said lower clamping position.

16. A releasable mounting apparatus for securely retaining of a cylindrical tank in an inverted vertical position adjacent to a seatback assembly of an emergency vehicle as defined in claim 15 wherein said tank retaining surface is generally concave to facilitate abutment with respect to a cylindrical tank positioned thereadjacent.

17. A releasable mounting apparatus for securely retaining of a cylindrical tank in an inverted vertical position adjacent to a seatback assembly of an emergency vehicle as defined in claim 15 wherein said top clamping assembly means includes a layer of tank retaining protective material extending over said tank retaining surface of said top clamping member to maximize protection of the cylindrical tank.

18. A releasable mounting apparatus for securely retaining of a cylindrical tank in an inverted vertical position adjacent to a seatback assembly of an emergency vehicle as defined in claim 1 wherein said top clamping member defines a tank placement surface facing outwardly away from said tank receiving zone responsive to said top clamping member being in the steady state lower clamping position, a cylindrical tank being adapted to be brought into abutting contact with respect to said tank placement surface during movement thereof toward said tank receiving zone to urge said top clamping member to move away from said lower clamping position and toward said upper releasing position to facilitate placement of the cylindrical tank therepast into said tank receiving zone and to facilitate tank removal therefrom.

19. A releasable mounting apparatus for securely retaining of a cylindrical tank in an inverted vertical position adjacent to a seatback assembly of an emergency vehicle as defined in claim 18 wherein said tank placement surface is convex to facilitate operative engagement thereof by a cylindrical tank while being moved toward said tank receiving zone.

20. A releasable mounting apparatus for securely retaining of a cylindrical tank in an inverted vertical position adjacent to a seatback assembly of an emergency vehicle as defined in claim 18 wherein said top clamping assembly means includes a layer of tank placement protective material extending over said tank placement surface of said top clamping member to maximize protection of the cylindrical tank.

21. A releasable mounting apparatus for securely retaining of a cylindrical tank in an inverted vertical position adjacent to a seatback assembly of an emergency vehicle as defined in claim 1 wherein said releasing means includes a releasing cable operatively attached to said top clamping member of said top clamping assembly means and operative responsive to pulling thereon to urge said top clamping member to move away from said lower clamping position and toward said upper releasing position to facilitate placement and removal of a cylindrical tank into and from said tank receiving zone.

22. A releasable mounting apparatus for securely retaining of a cylindrical tank in an inverted vertical position adjacent to a seatback assembly of an emergency vehicle as defined in claim 21 wherein said releasing cable comprises an outer sheath member and an internal cable member slideably movable mounted extending longitudinally therewithin and wherein said outer sheath member is attached with respect to the seatback assembly and wherein said internal cable member is attached to said top clamping member to be operative to urge said top clamping member to move away from said lower clamping position and toward said upper releasing position to facilitate placement and removal of a cylindrical tank into and from said tank receiving zone.

23. A releasable mounting apparatus for securely retaining of a cylindrical tank in an inverted vertical position adjacent to a seatback assembly of an emergency vehicle as defined in claim 22 wherein said top clamping member of said top clamping assembly means includes an eccentric cam arm extending outwardly therefrom and wherein said internal cable member is attached to said eccentric cam arm to operatively facilitate movement of said top clamping member away from said lower clamping position toward said upper releasing position responsive to pulling on said internal cable member.

24. A releasable mounting apparatus for securely retaining of a cylindrical tank in an inverted vertical position adjacent to a seatback assembly of an emergency vehicle as defined in claim 1 wherein said top clamping member is pivotally moveable with respect to the seatback assembly between said lower clamping position and said upper releasing position thereof.

25. A releasable mounting apparatus for securely retaining of a cylindrical tank in an inverted vertical position adjacent to a seatback assembly of an emergency vehicle as defined in claim 1 wherein said top clamping member includes a stopping means extending outwardly therefrom which is adapted to engage a portion of the seatback assembly responsive to pivotal movement thereof to said lower clamping position for retaining of said top clamping member in the steady state position in engagement therewith.

26. A releasable mounting apparatus for securely retaining of a cylindrical tank in an inverted vertical position adjacent to a seatback assembly of an emergency vehicle as defined in claim 1 wherein any force exerted by abutment of a cylindrical tank while positioned within said tank receiving zone against said top clamping member of said top clamping assembly means will urge movement thereof toward said lower clamping position to further facilitate retaining of the cylindrical tank secured in place within said tank receiving zone.

27. A releasable mounting apparatus for securely retaining of a cylindrical tank in an inverted vertical position adjacent to a seatback assembly of an emergency vehicle as defined in claim 1 wherein the seatback assembly is positioned oriented facing forwardly within an emergency vehicle such that any forces exerted upon the cylindrical tank responsive to braking or deceleration of the emergency vehicle will cause a cylindrical tank positioned within said tank receiving zone to exert force against said top clamping member of said top clamping assembly means to urge movement thereof toward said lower clamping position to further facilitate retaining of the cylindrical tank secured in place within said tank receiving zone.

28. A releasable mounting apparatus for securely retaining of a cylindrical tank in an inverted vertical position adjacent to a seatback assembly of an emergency vehicle comprising:
  A. a foot plate attached to a seatback assembly of an emergency vehicle;
  B. a top clamping assembly means attached with respect to the seatback assembly at a position above said foot plate to define a tank receiving zone therebetween which is adapted to receive a cylindrical tank positioned therewithin in an inverted orientation extending generally vertically, said top clamping assembly means being adapted to facilitate engaging and retaining a cylindrical tank positioned within said tank receiving zone, said tank receiving zone being defined below said top clamping assembly means and above said foot plate and extending generally vertically therebetween, said top clamping assembly means including:
    (1) a rear positioning means attached with respect to the seatback assembly and extending outwardly therefrom, said rear positioning means being adapted to abut a cylindrical tank responsive to movement thereof toward said tank receiving zone to facilitate positioning and selective securement thereof within said tank receiving zone, said rear positioning means of said top clamping assembly means being flexibly resilient to facilitate movement thereof between a compressed position responsive to movement of a cylindrical tank into said tank receiving zone and an extended position extending at least partially into said tank receiving zone responsive to said tank receiving zone being empty, said rear positioning means of said top clamping assembly means including a rear bumper means mounted to said abutment surface thereof to facilitate maintaining of abutting contact thereof with respect to the cylindrical tank minimizing damaging thereof;
    (2) an upper centering guide member attached with respect to the seatback assembly adjacent said rear positioning means and above said tank receiving zone, said upper centering guide member including a downwardly facing guide surface to facilitate retaining and guiding of movement of a cylindrical tank into and out of said tank receiving zone, said upper centering guide member of said top clamping assembly means including:
      (a) a primary guide section extending generally horizontally and adapted to extend over the bottom end of a cylindrical tank positioned inverted in said tank receiving zone;
      (b) a first side guide section attached to said primary guide member and extending obliquely outwardly and downwardly with respect thereto to extend over the lateral lower side of a cylindrical tank positioned inverted in said tank receiving zone;
      (c) a second side guide section attached to said primary guide member at a position spatially disposed from said first side guide section and extending obliquely outwardly and downwardly with respect to said primary guide section, said second side guide section adapted to extend over the lateral lower side of a cylindrical tank positioned inverted in said tank receiving zone at a position spatially disposed from said first side guide section;
    (3) a top clamping member attached with respect to the seatback assembly adjacent said upper center guide means and said rear positioning means and being movable between a lower clamping position laterally adjacent said tank receiving zone for securely retaining a cylindrical tank therewithin and an upper releasing position for allowing of a cylindrical tank into and out of said tank receiving zone;
    (4) a return biasing means comprising a flexibly resilient coil spring wound around said top clamping member and attached with respect to the seatback assembly and attached to said top clamping member for continuously urging movement of said top clamping member toward said lower clamping position to facilitate selective secure retaining of a cylindrical tank within said tank receiving zone; and
  C. a releasing means operatively attached with respect to said top clamping member and being selectively operative to urge said top clamping member to move away from said lower clamping position and toward said upper releasing position to facilitate placement and removal of the cylindrical tank with respect to said tank receiving zone as desired.

29. A releasable mounting apparatus for securely retaining of a cylindrical tank in an inverted vertical position adjacent to a seatback assembly of an emergency vehicle comprising:
- A. a backing plate extending generally vertically:
- B. an upper bracket means attached to said backing plate which includes:
  - (1) a rear panel attached to said backing plate;
  - (2) a first side panel extending outwardly from said rear panel;
  - (3) a second side panel extending outwardly from said rear panel at a position spatially disposed from said first side panel;
- C. a foot plate mounted to said backing plate at a position spatially disposed below said upper bracket means to facilitate defining a tank receiving zone therebetween which is adapted to receive a cylindrical tank stored therewithin in an inverted orientation extending generally vertically;
- D. a top clamping assembly means attached with respect to said upper bracket means and said backing plate and adapted to engage and retain a cylindrical tank positioned within said tank receiving zone, said tank receiving zone being defined below said top clamping assembly means and above said foot plate and extending generally vertically along and adjacent said backing plate, said top clamping assembly means including:
  - (1) a rear positioning means attached with respect to said back plate and extending outwardly therefrom, said rear positioning means being adapted to abut a cylindrical tank responsive to movement thereof toward said tank receiving zone to facilitate positioning and selective securement thereof within said tank receiving zone, said rear positioning means of said top clamping assembly means being flexibly resilient to facilitate movement thereof between a compressed position responsive to movement of a cylindrical tank into said tank receiving zone and an extended position extending at least partially into said tank receiving zone responsive to said tank receiving zone being empty, said rear positioning means of said top clamping assembly means including a rear bumper means mounted to said abutment surface thereof to facilitate maintaining of abutting contact thereof with respect to the cylindrical tank minimizing damaging thereof;
  - (2) an upper centering guide member attached with respect to said upper bracket means and said back plate adjacent said rear positioning means and above said tank receiving zone, said upper centering guide member including a downwardly facing guide surface to facilitate guiding of retaining and movement of a cylindrical tank into and out of said tank receiving zone, said upper centering guide member of said top clamping assembly means including:
    - (a) a primary guide section extending generally horizontally and adapted to extend over the bottom end of a cylindrical tank positioned inverted in said tank receiving zone;
    - (b) a first side guide section attached to said primary guide member and extending obliquely outwardly and downwardly with respect thereto to extend over the lateral lower side of a cylindrical tank positioned inverted in said tank receiving zone;
    - (c) a second side guide section attached to said primary guide member at a position spatially disposed from said first side guide section and extending obliquely outwardly and downwardly with respect to said primary guide section, said second side guide section adapted to extend over the lateral lower side of a cylindrical tank positioned inverted in said tank receiving zone at a position spatially disposed from said first side guide section;
  - (3) a top clamping member attached with respect to said upper bracket means adjacent said upper center guide means and said rear positioning means and being movable between a lower clamping position laterally adjacent said tank receiving zone for securely retaining a cylindrical tank therewithin and an upper releasing position for facilitating selective movement of a cylindrical tank into and out of said tank receiving zone;
  - (4) a return biasing means comprising a flexibly resilient coil spring wound around said top clamping member and attached with respect to the seatback assembly and attached to said top clamping member for continuous urging movement of said top clamping member toward said lower clamping position to facilitate selective secure retaining of a cylindrical tank within said tank receiving zone; and
- E. an releasing means operatively attached with respect to said top clamping member and being selectively operative to urge said top clamping member to move away from said lower clamping position and toward said upper releasing position to facilitate placement and removal of the cylindrical tank with respect to said tank receiving zone as desired.

30. A releasable mounting apparatus for securely retaining of a cylindrical tank in an inverted vertical position adjacent to a seatback assembly of an emergency vehicle comprising:
- A. a foot plate attached to a seatback assembly of an emergency vehicle;
- B. a top clamping assembly means attached with respect to the seatback assembly as a position above said foot plate to define a tank receiving zone therebetween which is adapted to receive a cylindrical tank positioned therewithin in an inverted orientation extending generally vertically, said top clamping assembly means being adapted to facilitate engaging and retaining a cylindrical tank positioned within said tank receiving zone, said tank receiving zone being defined below said top clamping assembly means and above said foot plate and extending generally vertically therebetween, said top clamping assembly means including:
  - (1) a top clamping member attached with respect to the seatback assembly at a position above said footplate and being movable between a lower clamping position laterally adjacent said tank receiving zone for securely retaining a cylindrical tank therewithin and an upper releasing position for allowing of a cylindrical tank to be moved into and out of said tank receiving zone;
  - (2) a return biasing means attached to said top clamping member for urging movement of said top clamping member toward said lower clamping position to facilitate selective secure retaining of a cylindrical tank within said tank receiving zone, said return biasing means being operative to urge said top clamping member to move toward said lower clamping position such that any force exerted by abutment of a cylindrical tank while positioned within said tank receiving zone against said top clamping member of said top clamping assembly means will urge movement thereof toward said lower clamping position to further facilitate retaining of the cylindrical tank secured in place within said tank receiving zone; and C. a releasing means operatively attached with respect to said top clamping member and being selectively operative to urge said top clamping member to move away from said lower clamping position and toward said upper releasing position to facilitate placement and removal of the cylindrical tank with respect to said tank receiving zone as desired.

* * * * *